United States Patent
Hallander et al.

(10) Patent No.: US 10,343,372 B2
(45) Date of Patent: Jul. 9, 2019

(54) COMPOSITE ARTICLE HAVING MULTIFUNCTIONAL PROPERTIES AND METHOD FOR ITS MANUFACTURE

(71) Applicant: SAAB AB, Linkoeping (SE)

(72) Inventors: Per Hallander, Linkoeping (SE);
Pontus Nordin, Linkoeping (SE);
Goete Strindberg, Linkoeping (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 15/322,972

(22) PCT Filed: Jul. 3, 2014

(86) PCT No.: PCT/SE2014/050849
§ 371 (c)(1),
(2) Date: Dec. 29, 2016

(87) PCT Pub. No.: WO2016/003339
PCT Pub. Date: Jan. 7, 2016

(65) Prior Publication Data
US 2017/0129207 A1    May 11, 2017

(51) Int. Cl.
*B32B 5/26* (2006.01)
*B29C 70/48* (2006.01)
(Continued)

(52) U.S. Cl.
CPC ............... *B32B 5/26* (2013.01); *B29C 70/08* (2013.01); *B29C 70/081* (2013.01); *B29C 70/48* (2013.01);
(Continued)

(58) Field of Classification Search
CPC ......... B32B 5/26; B32B 5/12; B32B 2605/18; B29C 70/48; B29C 70/08; B29L 2031/3076; B29K 2105/0809
See application file for complete search history.

(56) References Cited

U.S. PATENT DOCUMENTS

2007/0093163 A1    4/2007    Brown
2009/0117363 A1    5/2009    Wardle et al.
(Continued)

FOREIGN PATENT DOCUMENTS

DE    102004042423 A1    3/2006
EP         2189277 A1    5/2010
(Continued)

OTHER PUBLICATIONS

Garcia, E. J., et al, "Fabrication and multifunctional properties of a hybrid laminate with aligned carbon nanotubes grown In Situ", *Composite Science and Technology*, 2008, vol. 68, pp. 2034-2041, Elsevier Ltd., Netherlands.
(Continued)

*Primary Examiner* — David Sample
*Assistant Examiner* — Donald M Flores, Jr.
(74) *Attorney, Agent, or Firm* — Alston & Bird LLP

(57) ABSTRACT

The present invention regards an article (5) comprising at least one composite material, comprising matrix material (19) and at least one micro-sized reinforcement element distributions (23), arranged in plies (13) positioned on top of each other. The nano-sized reinforcement elements (17, 17', 17", 17''') are arranged in between and/or inside the micro-sized reinforcement element distributions (23), the nano-sized reinforcement elements (17, 17', 17", 17''') having matrix material accumulation properties so as to provide a tailored increased reinforcement volume of said one or more distributions (23). The present invention regards a method for manufacture of a composite article (5) and use of the article (5).

28 Claims, 6 Drawing Sheets

(51) Int. Cl.
  *B32B 5/12* (2006.01)
  *B29C 70/08* (2006.01)
  *B82Y 30/00* (2011.01)
  *B29C 70/88* (2006.01)
  *B29K 105/08* (2006.01)
  *B29L 31/30* (2006.01)

(52) U.S. Cl.
  CPC ............ *B29C 70/88* (2013.01); *B29C 70/887* (2013.01); *B32B 5/12* (2013.01); *B82Y 30/00* (2013.01); *B29K 2105/0809* (2013.01); *B29L 2031/3076* (2013.01); *B32B 2605/18* (2013.01)

(56) References Cited

U.S. PATENT DOCUMENTS

| | | |
|---|---|---|
| 2010/0203316 A1 | 8/2010 | Hata et al. |
| 2011/0143087 A1 | 6/2011 | Alberding et al. |
| 2011/0167781 A1 | 7/2011 | Maheshwari |
| 2013/0288036 A1 | 10/2013 | Schulze et al. |
| 2014/0306164 A1* | 10/2014 | Restuccia ............... C08K 3/04 252/511 |

FOREIGN PATENT DOCUMENTS

| | | | |
|---|---|---|---|
| WO | WO 2007/130979 A2 | 11/2007 | |
| WO | WO 2009/080048 A2 | 7/2009 | |
| WO | WO 2011/087411 A1 | 7/2011 | |
| WO | WO 2011/0087411 A1 | 7/2011 | |
| WO | WO 2011087411 A1 * | 7/2011 | ........... B29C 70/081 |
| WO | WO 2011/096851 A1 | 8/2011 | |
| WO | WO 2011/096861 A1 | 8/2011 | |
| WO | WO 2011/0096861 A1 | 8/2011 | |
| WO | WO 2011096861 A1 * | 8/2011 | ............ B29C 33/40 |
| WO | WO 2013/186389 A1 | 12/2013 | |
| WO | WO 2014011293 A2 * | 1/2014 | ........... B29C 70/882 |

OTHER PUBLICATIONS

International Searching Authority, International Search Report and Written Opinion for International Application No. PCT/SE2014/050849, dated Apr. 8, 2015, 21 pages, Swedish Patent and Registration Office, Sweden.

Veedu, V. P., et al, "Multifunctional composites using reinforced laminae with carbon-nanotube forests", *Nature Materials,* May 7, 2006, pp. 457-462, vol. 5, Macmillian Publishers Limited, U.K.

European Patent Office, Extended Search Report for Application No. 14896479.4, dated Jan. 16, 2018, 10 pages, Germany.

* cited by examiner

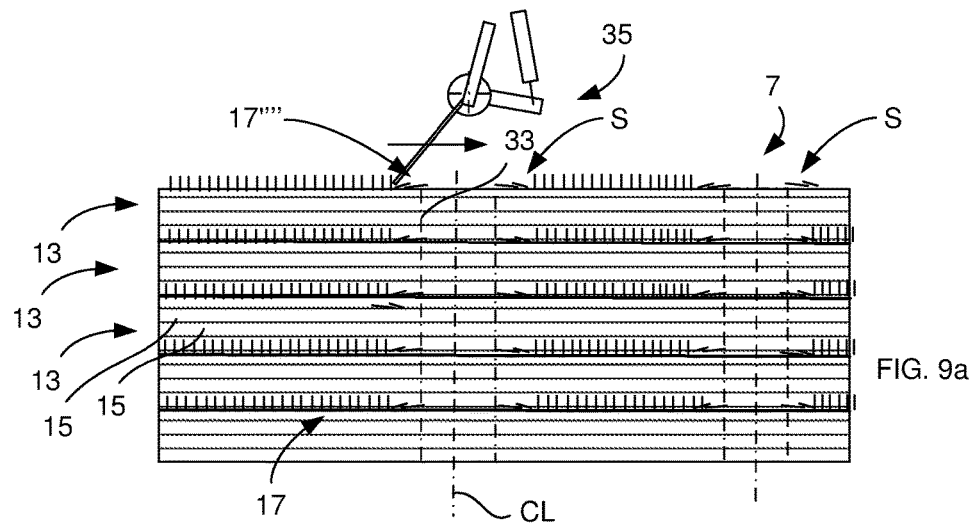
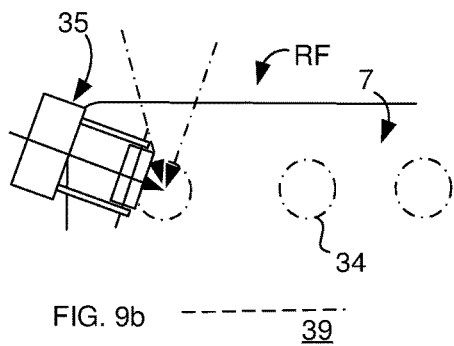
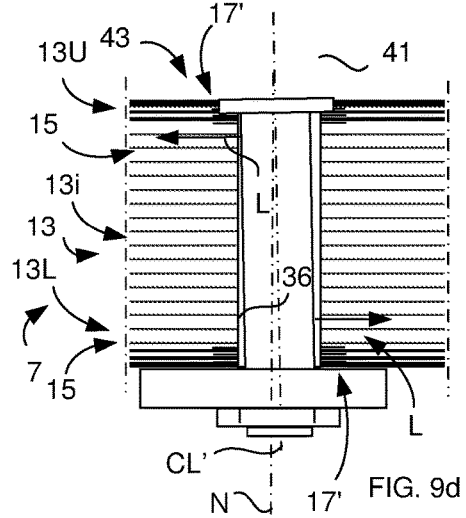
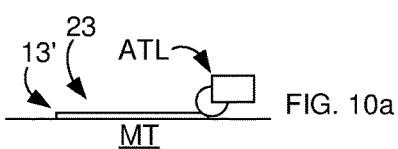
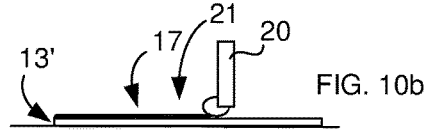
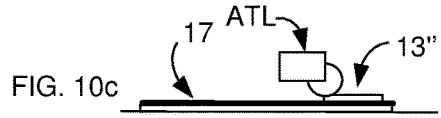
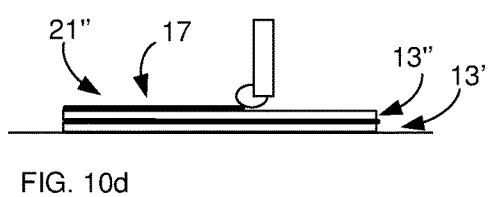
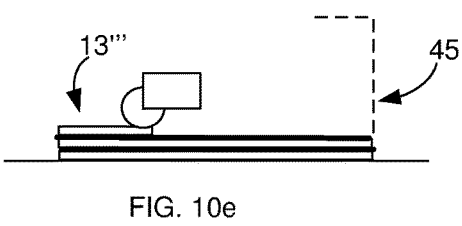

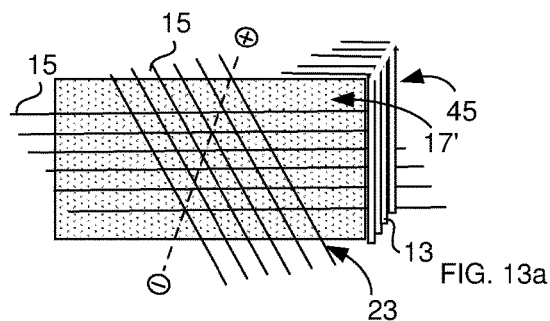
FIG. 13a
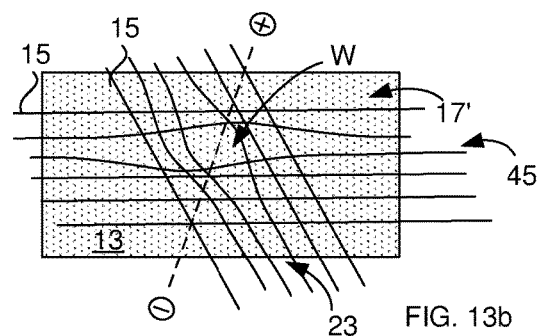
FIG. 13b
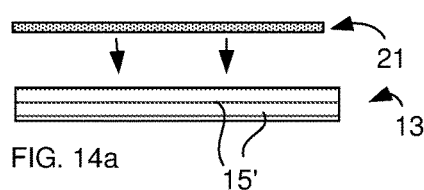
FIG. 14a
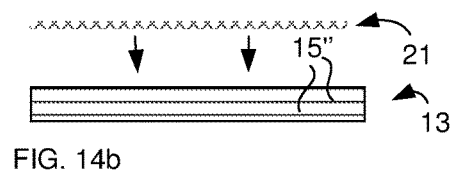
FIG. 14b
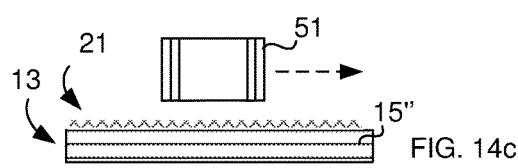
FIG. 14c
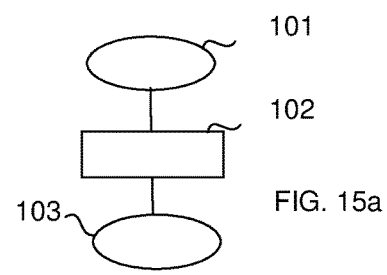
FIG. 15a
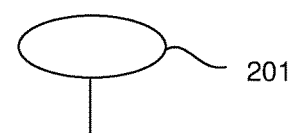
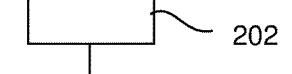
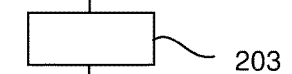
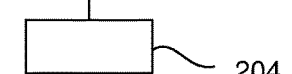
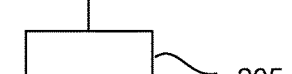
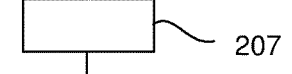
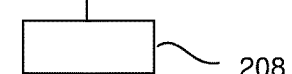
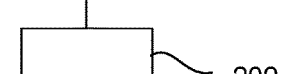
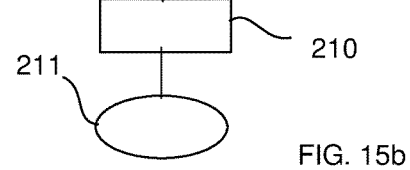
FIG. 15b

US 10,343,372 B2

COMPOSITE ARTICLE HAVING MULTIFUNCTIONAL PROPERTIES AND METHOD FOR ITS MANUFACTURE

CROSS REFERENCE TO RELATED APPLICATIONS

This application is a National Stage Application, filed under 35 U.S.C. 371, of International Application No. PCT/SE2014/050849, filed Jul. 3, 2014; the contents of which as are hereby incorporated by reference herein in their entirety.

BACKGROUND

Related Field

The present invention relates to an article according to the preamble of claim 1. The invention also relates to a method according to claim 29. The invention further relates to a use of an article according to claim 40.

The present invention primarily also relates to improvement of mechanical, electrical, processing—and other properties of fiber reinforced polymeric materials and structures and methods for producing such composite materials and articles, but also other materials and material combinations that will benefit from the invention.

The invention regards the aeronautic industry including manufacture and operation of aircraft and other airborne vehicles and platforms, such as missiles, spacecraft, launch rockets etc. The invention is not limited thereto, but could also be related to naval industry or other industries making use of composite materials. The invention can be used also in automotive engineering, trains, wind power blades etc.

Description of Related Art

Today, carbon fiber reinforced a common engineering material for above-mentioned airborne vehicles and platforms. Similar composite materials using identical or different fibers and matrix materials are also used in other industrial sectors, e.g. for defense products, automotive, nautical, wind power and other structurally efficient applications. Current technologies for the manufacture of aircraft wings, vertical and horizontal stabilizers etc., sub-structures and other structural parts of aircraft are using such composite materials in different ways.

Today, research and development efforts in the aircraft industry are focusing on design and manufacturing technologies for producing more environmentally friendly aircraft. One solution is to save weight of the structural parts of the aircraft whereby the fuel consumption can be reduced.

A structural part or an article, such as an airplane wing, or a wind mill blade or any other structure, can be designed as a composite structure, which may be made from multiple sheets of pre-impregnated fibers (pre-preg) joined together. The sheets of pre-preg plies are usually each 0.1-0.5 mm thick (other thicknesses are available) and the number of plies of pre-impregnated fibers used to form the composite structure varies, depending on the design of the structural part. Common pre-preg types are based on carbon fiber reinforced plastic (CFRP). However, other fibers such as aramid, aluminium oxide, other ceramic materials, quartz, silicon carbide, nano-modified carbon fibers or glass fibers, as well as metal fibers and natural fibers (hemp, flax), may be used to form the composite structure.

Other composite materials and other matrix systems, including materials with other reinforcing elements and those without reinforcement, are also suitable for the modifications described in this invention.

A common way to process and manufacture composite structures is the well-known pre-preg (layer of fibre material previously impregnated with resin) technology.

Alternative ways to pre-preg processing for producing a composite structure are Liquid Composites Molding (LCM) processes such as resin transfer molding (RTM) and other methods, wherein fibers are placed in a mold and resin is added to the mold. The resin subsequently is cured and the composite structure achieved having fibers distributed within the resin. Other infusion-based methods, such as resin film infusion (RFI), vacuum-assisted resin transfer molding (VARTM) and numerous applications and combinations of lay-ups, forming and curing procedures are used by the industries. Most manufacturing processes, alone or in combination, will benefit from the described invention.

The aeronautic industry composite technology state of the art is mainly based on CFRP, which has reached a high level of technical maturity.

The document US 2009/0117363 discloses the use of CNTs (carbon nano tubes) in a composite ply structure including reinforcement fibers impregnated with a resin matrix. The CNTs are comprised in as a bonding agent for mechanical bonding between the plies.

There is an object to provide an article that can be used, e.g. for aircraft, with multi-functional properties.

A further object is to provide a high fiber volume of an article.

Yet a further object is to provide an article being cost-effective to produce.

An object is to provide an article that helps to save weight.

A further object is to improve mechanical and electrical properties of an article.

A yet further object is to improve the performance of the CFRP material.

An object is to reduce the article cost.

A further object is to improve the matrix material performance of an article.

There is an object to improve CFRP structures weak properties like bolt bearing-, open hole compression-, interlaminar shear-intralaminar tension strength and other mechanical properties.

There is an object to provide an article, that can be used for environmentally friendly aircraft. One solution is to save weight of the structural parts of the aircraft, whereby the fuel consumption can be reduced and thus greenhouse gases $CO_2$, NOX etc. Reduced weight of the aircraft will also lead to less noise.

An object is to improve an article and its properties in order to develop an article having high strength at the same time as thermal and electrical conductivity (or other functionality) can be combined in one tailored material.

A yet further object is to provide an article having a property for reducing or elimination of the so called edge glow effect in the structural or non-structural articles, especially in an aeronautic article comprising CFRP (i.e. comprising matrix material and micro-sized reinforcement element distributions) subjected to lightning strike.

There is an object to optimize the use and efficiency of the composite article (such as CFRP articles) in structural applications by improving the fracture toughness of the matrix material.

A further object is to combine CFRP and/or other fiber reinforced materials with engineered additions of CNTs (and/or other nano-sized reinforcement elements such as graphene) in different ways in order to improve targeted composite properties of an article, such as those currently limiting mechanical properties (mainly controlled by the matrix phase in the CFRP composite) and/or electrical, thermal and physical properties, such as shape distorsion behavior, thermal and/or physical residual stresses, moisture swelling etc., currently limiting the use of CFRP.

A yet further object is to provide a method for improving mechanical and/or electrical and/or thermal and/or other physical and/or processing properties of fiber reinforced plastic composite materials, which can be used for an article.

It is a general object to eliminate drawbacks with prior art articles and with prior art methods for manufacture of articles. There is thus an object to improve the current technology.

BRIEF SUMMARY

The above-mentioned object or objects or other objects (derived from the application or prior art technologies) taken separately or in combination being achieved by the article defined in the introduction, which article is characterized as comprising at least one composite material, comprising matrix material (19) and at least one micro-sized reinforcement element distributions (23), arranged in plies (13) positioned on top of each other, wherein nano-sized reinforcement elements (17, 17', 17", 17''') are arranged at least one of in between, inside of, or on one side of an outer surface of the micro-sized reinforcement element distributions (23), and wherein the nano-sized reinforcement elements (17, 17', 17", 17''') have matrix material accumulation properties so as to provide a tailored increased reinforcement volume of said one or more distributions (23).

In such way the nano-sized reinforcement will, during the composite article manufacturing stage, provide accurate control of local micro-sized reinforcement volume and also the article per se will have suitable composite article properties, such as added strength, electrical conductivity etc. This will improve structural efficiency, weight reduction and other composite properties provided by both the micro-sized and the nano-sized reinforcement. Such article will also be suitable for optional use for conducting of electrical current through the article. Prior art articles having traditional conductors are heavy and costly to produce.

Preferably, the micro-sized reinforcement element distributions comprise micro sized fiber distributions.

Suitably, the fibers of the micro sized fiber distributions may be structural reinforcement fibers of graphite, carbon, silicon carbide, alumina, E-glass, aramid, polyethylene, quartz, organic or other fibers or a combination of these used for this purpose as well as fibers used for electrical or thermal properties or other purpose.

Alternatively, the micro-sized reinforcement element distributions comprise arranged nano-sized reinforcement elements.

In such way the article per se will have suitable composite article properties, such as added strength, electrical conductivity etc. depending on selection of nano-sized reinforcement type, in combination with the composite properties provided by the micro-sized fibers in the composite article. This will improve structural efficiency, weight reduction and other composite properties provided by both the micro-sized fibers and the nano-sized reinforcement.

Preferably, the matrix material can be one or several different materials.

By using a selected matrix material, additional properties can be engineered into the composite material. This will further improve structural efficiency, weight reduction and other composite properties provided by the nano-sized reinforcement.

Suitably, the matrix materials can be one or more of: several thermoset polymeric materials such as epoxy based resin, bismaleimide resin, polyimide, vinyl ester, cyanate ester, phenyl ethynyl-terminated imide (PETI) resin, thermoplastic polymeric materials and phenolic resin, or combinations thereof; or a thermoplastic resin selected from the group consisting of polyether ether ketone (PEEK), polyether ketone ketone (PEKK), polyphenylene sulfide (PPS), polyetherimide (PEI), nylon 6, nylon 66, polyethylene terephthalate (PET), or combinations thereof; or mixtures thereof; or ceramic materials; or metallic materials, depending on the application.

Depending on the application and requirements specific to that application, e.g. use temperature, certain matrix materials will be more efficient than others. Several matrix materials are listed herein as examples of useful materials for the invention.

Preferably, the nano-sized reinforcement elements are arranged, for example regarding orientation, in order to improve the article properties.

Preferably, the nano-sized reinforcement elements comprise Carbon Nano Tubes (CNTs).

The nano-sized reinforcement elements, in this case carbon nanotubes (CNT), are arranged, e.g. regarding orientation, in order to improve the article properties.

Preferably, the nano-sized reinforcement elements are aligned, e.g. as grown CNT "forests", radially grown CNTs on micro-sized fibers and other available forms of nano-sized materials in aligned arrangements.

The nano-sized reinforcement elements, in this case carbon nanotubes (CNT), are aligned in order to improve the article properties. This alignment can be vertical (grown forests of CNT) or in other directions, shape, height or patterns.

Suitably, the nano-sized reinforcement elements are arranged in between two, several or all plies of the composite article, including the case where the nano-sized reinforcement elements have been formed (grown) on the surface of the micro-sized reinforcement elements (fibers).

The nano-sized reinforcement elements, in this case carbon nanotubes (CNT), are aligned in order to improve the article properties. This alignment can be vertical (grown forests of CNT) or in other shape, Alternatively, the CNT arrangements can e.g. be placed in-between layers of micro-sized reinforcement arrangements, i.e. in-between e.g. carbon fiber reinforced plastic (CFRP) plies in a laminate. CNT arrangements can also be grown on the surface of individual carbon fibers that are used in a CFRP composite material. Other arrangements of CNTs are also useful for realization of the invention depending on choice of materials, the actual application and other specific conditions.

Preferably, the location and/or width and/or height and/or volume content of the nano-sized reinforcement elements (17, 17', 17", 17''') is constant or different, including locally no addition of nano-sized materials, through the thickness of the composite article (5).

The nano-sized reinforcement elements, in this case carbon nanotubes (CNT), are aligned in order to improve the article properties. This alignment can be vertical (grown forests of CNT) or in other shape.

The use of CNT, according to one aspect of the present invention, in composite materials based on micro-sized reinforcement element can be tailored to the application by selecting position, width, height, density and other characteristics of the arranged (e.g. aligned) nano-sized reinforcement elements. This selection can vary in the article, including spots or areas where no nano-sized elements are used.

Suitably, the nano-sized reinforcement elements are aligned in a direction orthogonally and/or any angle direction to the plane of the ply.

The use of CNT, according to one aspect of the present invention, in composite materials based on micro-sized reinforcement element can be tailored to the application by selecting position, width, height, density and other characteristics of the arranged (e.g. aligned) nano-sized reinforcement elements. This selection can vary in the article, including spots or areas where no nano-sized elements are used. When used in a composite article with a local predominant laminate plane, e.g. in a wing skin laminate, the orientation of aligned nano-sized reinforcement arrangement can be orthogonal, parallel or placed in any other direction to that plane. The orientation of the nano-sized elements can also vary within a plane and/or comprise two or more layers with the same or different direction in each layer.

The orientation of the nano-sized elements can also vary within a plane. This arrangement of nano-sized elements can also consist of two or more individual layers of elements with the same or different orientation in each individual layer.

Alternatively, the nano-sized reinforcement elements are arranged in single or multiple individual sub-plies stacked or interleafed as to form combinations of element orientations and sub-ply thicknesses suitable regarding functionality to enhance overall composite manufacturability and performance.

Preferably, the orientation of the nano-sized elements can also vary within a plane. This arrangement of nano-sized elements can also consist of two or more individual layers of elements with the same or different orientation in each individual layer. In order to enhance composite article manufacturability and functionality, e.g. improved mechanical strength and/or electrical conductivity, sub-ply layers of the nano-sized reinforcement elements can comprise selected element orientations. Such arrangements may e.g. improve formability of uncured CFRP lay-ups, improve selected mechanical properties, improve local electrical conductivity and other functionality of priority in a given application.

Suitably, the portion of the nano-sized reinforcement elements being arranged with orientation parallel with the plane of the ply and in radial and/or other direction of a hole in the composite article.

In the case of mechanical strengthening of the composite structure in the vicinity of a hole, e.g. a hole for a mechanical fastening element (bolt, rivet et cetera) in a joint area in a CFRP structure, the nano-sized reinforcement elements can be oriented in the plane of the laminate, or orthogonally or any other orientation, with selected orientation, including radially oriented from the hole perimeter. This will improve important mechanical properties needed when designing a bolted or riveted joint for load carrying, including improved bolt bearing strength of the nano-enhanced composite laminate with local tailored micro fiber volume in the composite article (preferably high in the vicinity of the hole) due to the addition of nano-sized elements.

Alternatively, the nano-sized reinforcement elements comprise Nano Cones.

Preferably, for many applications, carbon based nano cones are alternative nano-sized reinforcement elements to CNTs, graphene and other suitable elements.

Suitably, the nano-sized reinforcement elements comprise Nano Discs.

Alternatively, the nano-sized reinforcement elements comprise Nano Fibers.

Preferably, the nano-sized reinforcement element distributions comprise graphene.

Suitably, for many applications, graphene is an alternative nano-sized reinforcement element to CNTs and other suitable elements.

Alternatively, the micro-sized reinforcement element distributions comprise distributed grown nano-sized reinforcement elements grown on a graphene substrate.

Preferably, for many applications, CNT arrangements grown on graphene are alternative nano-sized reinforcement elements to other suitable nano elements.

Suitably, the micro sized reinforcement element distributions comprise graphite, including multilayers of graphene.

Alternatively, for many applications, graphite, few layer graphene and multi-layer graphene are alternative nano-sized reinforcement elements to other suitable nano elements.

Preferably, the micro-sized reinforcement element distributions comprise distributed grown nano-sized reinforcement elements grown on a graphite substrate.

This will improve important mechanical properties needed when designing a bolted or riveted joint for load carrying, including improved bolt bearing strength of the nano-enhanced composite laminate with local tailored micro fiber volume in the composite article (preferably high in the vicinity of the hole) due to the addition of nano-sized elements according to claims. For many applications, CNT arrangements grown on graphite are alternative nano-sized reinforcement elements to other suitable nano elements.

Suitably, the composite material is arranged for de-icing/anti-icing.

In such way a composite material is provided that can be used for de-icing/anti-icing, at the same time as weight is saved and cost effective production being achieved, providing a composite material having high strength.

Alternatively, the composite material is arranged for electrical conductivity/insulation of the article, including fulfilling the criteria for a functionally graded material.

In such way a composite material is achieved that can be used for conducting electricity in integral structural conductors engineered in the composite material.

For electrical conductivity and/or insulation, many technical solutions are possible, based on the invention.

Preferably, the micro-sized reinforcement elements are conductive fibers, the nano-sized reinforcement elements can be used to obtain a higher fiber volume of the micro-sized fibers, thereby achieving an improved electrical conductivity in the composite article. In addition, if the nano-sized reinforcement elements are carbon nanotubes, or any other electrically conductive material, the nano-sized elements will further improve the electrical conductivity of the article. Carbon nanotubes in suitable arrangements such as aligned CNTs will significantly improve electrical conductivity. Corresponding solutions, with low fiber volume of the micro-sized reinforcement elements in combination with non-conducting nano-sized elements, e.g. boron nitride nanotubes, will result in arrangements with improved electrical insulation of the article. By using a design solution with gradually increasing or decreasing volumes of the micro-sized and/or nano-sized reinforcement element, composite properties can be gradually changed in the article. This type of engineered micro and/or nano composite design is corresponding to the commonly used functionally grade materials (FGM), usually selected when materials or layers with dissimilar properties are joined or combined in the same article.

Suitably, the composite material is arranged for electromagnetic transmission, including fulfilling the criteria for a functionally graded material.

Alternatively, for composite articles with designed electromagnetic transmission, many technical solutions are possible, based on the invention. If the micro-sized reinforcement elements have inherent electromagnetic properties, the nano-sized reinforcement elements can be used to obtain a higher fiber volume of the micro-sized element composite, thereby achieving an improved electromagnetic function in the composite article, if this function is affected by the quantities of the micro-sized element. In addition, if the nano-sized reinforcement elements are carbon nanotubes, or any other electromagnetic material, such as dielectric or magnetic fibers or particles, the nano-sized elements will further improve the electromagnetic function of the article. Carbon nanotubes in suitable arrangements such as aligned CNTs can significantly improve electromagnetic functionality. By using a design solution with gradually increasing or decreasing volumes of the micro-sized and/or nano-sized reinforcement element, composite properties can be gradually changed in the article. This type of engineered micro and/or nano composite design is corresponding to the commonly used functionally grade materials (FGM), usually selected when materials or layers with dissimilar properties are joined or combined in the same article.

Preferably, the composite material is arranged for thermal conductivity/insulation of the article, including fulfilling the criteria for a functionally graded material.

In such way is achieved a composite material that can be used for conducting e.g. heat at the same time as it has low weight and high strength. The material can also be designed to insulate certain portions of the composite material from not conducting e.g. heat.

Suitably, for composite articles with designed thermal conductivity and/or insulation, many technical solutions are possible, based on the invention. If the micro-sized reinforcement elements are thermally conductive fibers, the nano-sized reinforcement elements can be used to obtain a higher fiber volume of the micro-sized fibers, thereby achieving an improved thermal conductivity in the composite article. In addition, if the nano-sized reinforcement elements are carbon nanotubes, or any other thermally conductive material, the nano-sized elements will further improve the thermal conductivity of the article. Carbon nanotubes in suitable arrangements such as aligned CNTs will significantly improve thermal conductivity. Corresponding solutions, with low fiber volume of the micro-sized reinforcement elements in combination with insulating nano-sized elements, will result in arrangements with improved thermal insulation of the article. By using a design solution with gradually increasing or decreasing volumes of the micro-sized and/or nano-sized reinforcement element, composite properties can be gradually changed in the article. This type of engineered micro and/or nano composite design is corresponding to the commonly used functionally grade materials (FGM), usually selected when materials or layers with dissimilar properties are joined or combined in the same article.

Alternatively, the composite material is arranged for controlled thermal elongation and/or contraction of the article, including fulfilling the criteria for a functionally graded material.

Preferably, for composite articles with designed thermal elongation, many technical solutions are possible, based on the invention. If the micro-sized reinforcement elements are high stiffness fibers with specific thermal elongation different than the matrix material, the nano-sized reinforcement elements can be used to obtain a higher fiber volume of the micro-sized fibers, thereby achieving an engineered thermal elongation of the composite article, not only in the plane of the micro-sized fibers but also in other directions, e.g. transverse to this plane. In addition, if the nano-sized reinforcement elements are carbon nanotubes, or any other material with dissimilar thermal elongation compared to the matrix material, the nano-sized elements will further change the thermal elongation of the article. Carbon nanotubes in suitable arrangements, such as aligned CNTs, will for instance significantly reduce thermal elongation (expansion) in directions perpendicular to the laminate plane of carbon fiber reinforced plastic laminates. Corresponding solutions, with low fiber volume of the micro-sized reinforcement elements in combination with tailored CTE (coefficient of thermal expansion) nano-sized elements, will result in arrangements with a higher CTE in selected directions of the article. By using a design solution with gradually increasing or decreasing volumes of the micro-sized and/or nano-sized reinforcement element, composite properties can be gradually changed in the article. This type of engineered micro and/or nano composite design is corresponding to the commonly used functionally grade materials (FGM), usually selected when materials or layers with dissimilar properties are joined or combined in the same article.

Suitably, the composite material is partly or totally made up from pre-impregnated micro-sized reinforcement elements, such as pre-preg plies.

In such way the composite material properties are improved by introducing local or global control of micro-sized reinforcement volume resulting from use of engineered nano-sized elements in the composite material and article.

One aspect of the present invention regarding improved functionality of composite parts is particularly well suited to materials using layered pre-impregnated fiber arrangements known as pre-preg materials. Pre-preg is commonly used in the aerospace industry, but also in many other industrial sectors such as wind power, sports, off-shore, automotive and naval. There are several aspects of the invention addressing many known shortcomings of the pre-preg technology, most of them originating from the dissimilar properties of the micro-sized reinforcing elements (e.g. carbon fibers) and the matrix material (e.g. cured epoxy resin). In case of CFRP pre-preg, the use of engineered arrangements of nano-sized elements (e.g. aligned carbon nanotubes) in-between and/or inside pre-preg layers will efficiently control the local or global fiber volume of the micro-sized reinforcement (e.g. carbon fiber volume) and thereby improve the composite properties as described in the preceding claims. Without adding significant complexity, the use of nano-sized elements in the described manner will significantly improve performance of composite articles using pre-preg technology. As a first step, this means that existing, currently used pre-preg materials can be used in the improved way in combination with add-on nano-sized elements described in this invention. This will facilitate and speed up industrial introduction of the innovation. Follow-on steps can include further optimization of industrial applications of the invention, e.g. by introducing new pre-preg versions more optimized (tailored) for the invention.

Preferably, the composite material is partly or totally made up from any other composite material form suitable for utilization with a manufacturing method comprising the steps of: a. providing nano-sized reinforcement elements (17, 17', 17", 17''') having matrix material accumulation properties; b. providing controlled thickness, package degree, orientation, and/or number of layers of said nano-sized reinforcement elements (17, 17', 17", 17'''); and c. arranging the nano-sized reinforcement elements (17, 17', 17", 17''') in between or in the micro-sized reinforcement element distributions (23) thereby providing tailored increased reinforcement volume of said distributions (23), wherein said thickness, package degree, orientation and number of layers of said nano-sized reinforcement elements (17, 17', 17", 17''') being defined so as to provide the desired electrical and/or electromagnetic and/or thermal and/or mechanical properties of the composite article (5) and/or material (7).

Suitably, the method further comprises: providing engineered resin impregnation, partially or fully impregnated to a pre-selected resin content, of the nano-sized reinforcement elements, the micro-sized fiber distributions or both, wherein the resin source alternatively being the pre-preg used, the resin used in a RTM process or separately added resin, such as a pre-manufactured resin film or any other suitable resin source.

In such way, this heating may be direct or indirect, using one or more of numerous possible heat sources such as inductive heating, IR lamps, ovens or electrical heating mats. Heating may be applied from one or both sides of individual plies in the composite lay-up. The heating may be applied continuously, step-wise or gradual or applied according to a suitable heating cycle in order to facilitate resin impregnation, formability, compaction or other application-based manufacturing requirements.

Preferably, heating may also be achieved by pre-heating the reinforcement elements (micro and/or nano sized) before assembly with the resin.

Alternatively, the method further comprises: positioning arrangements of pre-manufactured nano-sized reinforcement elements are positioned on composite material ply surfaces, heated to facilitate impregnation by the composite material matrix material, e.g. an uncured resin, and/or non-heated impregnation, followed by the lay-up of consecutive composite plies, forming of ply stacks, vacuum-bagging of the ply assembly and curing of the composite article.

Preferably, the step of providing nano-sized reinforcement elements comprises orientation of the nano-sized reinforcement elements parallel with the plane of the ply.

Suitably, the step of providing nano-sized reinforcement elements comprises orientation of the nano-sized reinforcement elements parallel with the plane of the ply and/or orthogonally and/or any angle direction to the plane of the ply.

Alternatively, the method further comprises the step of arranging the nano-sized reinforcement elements in radial and/or other direction(s) in the area of a planned hole in the composite article.

Suitably, the method further comprises providing application of pressure on local or global areas of the composite materials used, such as nano and micro sized elements, during or after the lay-up of material but before the curing of the same.

Preferably, the composite materials comprise all relevant materials listed in any of following claims.

Suitably, the method comprises the step of applying a voltage to electrically conducting fibers in the polymeric matrix composite material, during processing, for repelling the micro-sized reinforcement elements from each other in pre-determined areas of the material thereby altering the distribution of the nano-sized reinforcement element between the micro-sized reinforcement elements.

Alternatively, the method includes filament winding and/or resin transfer molding.

The above-mentioned object or objects or other objects (derived from the application or prior art technologies) taken separately or in combination being achieved by the use of an article comprising at least one composite material, comprising matrix material (19) and micro-sized reinforcement element distributions (23), each being arranged in a respective ply (13) provided on top of each other, wherein nano-sized reinforcement elements (17, 17', 17", 17''') are arranged in between and/or inside the micro-sized reinforcement element distributions (23), the nano-sized reinforcement elements (17, 17', 17", 17''') having matrix material accumulation properties so as to provide a tailored increased reinforcement volume of said one or more distributions (23), characterized by that the article is an aeronautic and/or aerodynamic article being used for electrical and/or electromagnetic and/or thermal and/or mechanical and/or controlled thermal expansion properties.

By this way it is possible to combine CFRP and/or other fiber reinforced materials with engineered additions of CNT in different ways in order to improve targeted composite properties such as those currently limiting mechanical properties (mainly controlled by the matrix phase in the CFRP composite) and electrical, thermal and physical properties currently limiting the use of CFRP.

The addition of nano materials can permit different improved types of CFRP materials and also significantly improve the manufacturing capability of the material.

Depending on the nano additive size, direction, height and other characteristics, there are different ways to improve mechanical, electrical, processing, and other properties.

The fiber volume for CFRP can be controlled in a simple and repetitive manner by use of the engineered CNT arrangements when integrated in a pre-preg lay-up.

This feature can be used in CFRP design for both mechanical and electrical function. Improved thermal conductivity can also be designed into the CFRP material.

One aspect of the invention is to use dry (or impregnated to a suitable degree) arrangements of aligned CNTs with a specific, optimized, locally tailored CNT length for the material properties to be improved. The CNT spacing within the arrangement, including transverse coupling and branching between individual CNTs, is one of the optimization parameters.

The CNT arrangement can be placed in between pre-preg plies.

In such way nano material can be used to improve the fracture toughness by reinforcing the plastic, which thus will exhibit improved interlaminar shear and/or intralaminar tension and/or tension strength. Thereby is achieved a fracture toughened composite material (such as CFRP material).

In such way being improved CFRP weak properties like bolt bearing, open hole compression, inter-laminar shear, intra-laminar tension, and tension strength.

This will improve the strength within the pre-preg ply and also the bolt bearing-, open hole compression-, interlaminar shear-intralaminar tension—and pure tension strength.

Preferably, the composite material is arranged for improved strength or reduced strength.

Suitably, the micro-sized reinforcement element distributions comprise surface distributed nano-sized reinforcement elements.

Alternatively, the surface distributed nano-sized reinforcement elements are arranged aligned.

Preferably, the nano-sized reinforcement elements comprise 2-D material elements, such as graphene.

Suitably, the matrix material comprises a plastic.

Alternatively, the matrix material comprises a ceramic and/or graphite and/or metal and/or elastomer and/or rubber.

Suitably, the composite material is arranged for electrical conductivity/insulation of the article.

Alternatively, the composite material is arranged for electromagnetic transmission.

Suitably, the composite material is arranged for controlled thermal elongation and/or contraction of the article fulfilling the criteria for a functionally graded material.

Preferably, the nano-sized reinforcement elements are arranged in between all plies of the composite material.

Suitably, the location and/or width and/or height of the nano-sized reinforcement elements being different through the thickness of the composite material.

Alternatively, the nano-sized reinforcement elements exhibit a direction orthogonally and/or angle direction to the plane of the ply.

Preferably, a portion of the nano-sized reinforcement elements being arranged with orientation parallel with the plane of the ply and with orientation in radial direction of a hole of the composite material.

In such way is achieved a cost-effective way of producing a composite for an article, wherein the composite is provided with desired electrical and/or thermal and/or strength and/or elongation and/or strength build-up properties.

By this mean the height of the that nano-sized reinforcement elements (e.g. a CNT mat) can be pre-determined for determining the amount of resin that will be drawn out of the adjacent micro-sized reinforcement element distributions being impregnated with resin or other matrix. This technique will allow control of the fiber volume in pre-preg plies and locally, it will be possible to achieve a relatively high fiber volume.

By this means it is possible to adapt a dry CNT mat as an internal vacuum channel in a pre-preg lay-up.

This allows the use of CFRP pre-preg material with lower bulk factor which is more easy to process than currently used "less impregnated" pre-preps with high bulk factors. The bulk factor for currently used less impregnated pre-preg materials is typically 1.02-1.20. The pre-preg bulk factor includes effects of both internal air (unimpregnated internal volumes or air channels) and entrapped air between the pre-preg plies in the lay-up. Both contributions will be reduced by use of CNT mats in the pre-preg lay-up and cured laminate quality (low porosity) as well as manufacturability of complex shapestructures will be improved.

Preferably, the step of determination comprises orientation of the nano-sized reinforcement elements parallel with the plane of the ply.

Suitably, the step of determination comprises orientation of the nano-sized reinforcement elements parallel with the plane of the ply and/or orthogonally and/or angle direction to the plane of the ply.

Alternatively, the method further comprises the step of arranging the nano-sized reinforcement elements in radial direction of a hole of the composite material.

Preferably, the matrix material comprises a resin.

Suitably, the method comprises the step of applying a voltage to the matrix material for repelling the micro-sized reinforcement elements from each other in pre-determined areas of the material thereby altering the distribution of the nano-sized reinforcement elements between the micro-sized reinforcement elements. Alternatively, the matrix material herein comprises nano-sized reinforcement elements.

In such way is achieved that the penetration of nano-sized reinforcement elements in between the micro-sized reinforcement elements between the efficiently can be controlled for altering the properties of the matrix and between the micro-sized reinforcement element distributions.

Alternatively, there is achieved a fiber reinforcement volume (of micro-sized reinforcement element distributions) of the composite material of 40-90 vol %, preferably 50-80 vol %.

Suitably, the ply comprises a plastic, in which the fiber distribution is embedded.

Preferably, the nano-sized fiber-like reinforcement elements are partially or fully embedded in a resin film under production of the composite laminate as part of the article.

Suitably, the porosity can be controlled by nano-sized fiber-like reinforcement element volume and by said resin film content separately or simultaneously.

In such way is achieved a composite material, which during production cost-effective can be controlled to comprise a relatively high fiber volume.

Thereby is provided a production line for an aircraft industry, in which production line a cost effective control of different properties of the composite material can be reached.

Thereby is also at the same time achieved enhanced interlaminar and intralaminar strength of the composite material.

Thereby is achieved a composite material that suitably being used for aircraft wing covers, aircraft vertical and horizontal stabilizer covers, other near-flat portions or double-curved/single curved articles. By providing a composite material with a high fiber volume by arranging (during production of the composite material) nano material between fiber plies to such extent that resin will be drawn from the plies into the added mat, thus increasing the fiber volume in the plies, the strength of the finished composite material may be increased. A strengthening of the composite material means that the composite material can be made thinner still exhibiting a strength corresponding to that of a current (prior art) composite material being thicker. This would allow for significant weight savings of aircraft and thereby fuel consumption can be reduced. This promotes the production of environmentally friendly aircraft.

Thereby the fiber volume of a composite material (such as CFRP) can be controlled in a simple and repetitive manner by use of the engineered nano element arrangements when integrated in a pre-preg ply lay-up procedure. This can be used in the composite material design for both mechanical and electrical functionality.

In such way the added nano-sized reinforcement elements improve the cured resin plies (layers) flat wise tension strength between two pre-preg plies or fiber fabric sheets (plies) of the article.

One mechanism is that the added nano-sized reinforcement elements improve the resin layers shear strength between two pre-preg plies or fabric sheets (fiber plies) of the uncured/cured matrix.

One mechanism is that the added nano-sized reinforcement elements improve the resin layers peel strength between two pre-preg plies or fabric sheets (fiber plies) of the uncured/cured matrix.

One mechanism is that the added nano-sized reinforcement elements improve the resin layers tension strength between two pre-preg plies or fabric sheets (fiber plies) of the uncured/cured matrix.

One further mechanism is that the added nano-sized reinforcement elements improve the friction properties, forming properties etc. of the uncured matrix material.

Preferably, the location and/or width and/or height of the nano-sized reinforcement elements (such as CNTs or MWCNTs, i.e. multi-wall CNTs, or others) can be different through the thickness of the composite material (the elements being arranged between the plies) and also in different areas of the composite material, for achieving predetermined properties of the finished composite material Alternatively, the arrangement of the nano-sized reinforcement elements can take place in an area where a fastener hole later on will be drilled.

Suitably, arrangements of nano-sized reinforcement element mats (such as CNT or MWCNT mats of different architecture) are provided in between the fiber plies of the composite material. The height of a dry mat can be of some micrometers up to about 100 (or more) micrometers or higher/longer depending upon application of the finished composite material.

Preferably, the prolongation of the nano-sized reinforcement elements exhibits a direction orthogonally to the plane of the ply.

Suitably, the prolongation of the nano-sized reinforcement elements is tilted and/or knocked down relative the plane of the ply.

In such way is achieved that the electrical conductivity of the composite material (predominantly in the transverse direction, i.e. orthogonally to the extension of the fibers, but alternatively also in other directions as well) will be improved at the same time. Prior art solutions for providing transverse electrical conductivity imply heavy and costly engineering in aircraft design or other aeronautic designs or other designs. Prior art systems, such as heavy lightning strike protection system, heavy laminate edge-glow protection system, and other add-on prior art systems exist today.

In such way is achieved that the added CNTs improve electrical conductivity to the composite material and at the same time will help bridging transverse electrical conductivity between individual plies. Thereby the so called edge glow effect in CFRP laminates can be eliminated or reduced. Edge glow, for example, can be caused by prior art thermoplastic interply layers added for matrix toughness. The added nano-sized reinforcement elements for achieving toughness allow the removal of thermoplastic thereby improving transverse electrical conductivity.

In such way the electrical conductivity of CFRP, predominantly in transverse direction (transverse to the main extension of the carbon fibers) achieved by one embodiment for an article provides low weight and cost-effective engineering solutions. There is thus not any longer need for lightning strike protection, laminate edge-glow protection and other add-on solutions to the article.

Thereby is achieved a reduction of the need for inclusion of thermoplastic toughening particles in the pre-preg.

Preferably, a pre-determined height of a dry nano-sized fiber-like reinforcement element mat (such as a CNT mat) (herein also called mat) applied in between two plies (such as pre-preg plies) will determine the amount of resin that will be drawn out, during the production, of the adjacent pre-preg plies. Such technique will allow control of the fiber volume in these pre-preg plies and locally and it will be possible to achieve a relatively high fiber volume. During curing (e.g. in an autoclave) of the composite material, the non-impregnated mat will pick up resin from the adjacent pre-preg plies, thereby increasing the fiber volume in the ply. The fiber volume can thus be increased locally (in the case the nano-sized reinforcement elements exhibit a predetermined length for achieving the matrix material distribution properties) and/or optimized in an efficient and cost-effective way due to this effect.

Suitably, the mat being positioned in between all or a few pre-preg plies of the composite material.

Alternatively, the mat being positioned on top and/or bottom surface of the article, including or not including above statement.

Preferably, the mat being impregnated with resin for controlling the properties of the composite material. The height of the mat can be tailored and in case of prolonged nano elements additional resin may need to be added in form of a resin film to achieve certain properties. The amount of resin used to impregnate the mat thus can be controlled within a very close tolerance, by placing a mat with a chosen height and nano-sized fiber-like reinforcement elements (herein also called nano elements) (such as CNTs) having a specific direction for a specific application.

Suitably, dry (or impregnated to a suitable degree) nano-sized fiber-like reinforcement elements (such as aligned CNTs), having a specific, optimized, locally tailored length, are provided for improving the composite material properties.

Preferably, the nano-sized fiber-like reinforcement elements exhibiting a direction orthogonally to the plane of the ply are connected to each other by branching nano-sized fiber-like reinforcement elements or entanglement of individual nano-sized fiber-like reinforcement elements, caused by tube waviness or other insintric properties of the nano-sized fiber-like reinforcement elements.

Alternatively, the nano-sized fiber-like reinforcement elements exhibiting a direction parallel with the plane of the ply or in other directions relative the ply. This also may apply for graphene applications.

In such way a spacing between the orthogonal nano-sized fiber-like reinforcement elements are achieved within the arrangement, including transverse coupling (electrically and/or thermally and/or mechanically) and branching between individual nano-sized fiber-like reinforcement elements. Such spacing can determine specific properties of the composite material.

Suitably, the nano-sized fiber-like reinforcement elements are arranged in between said fiber distributions for increasing the fiber volume providing a locally porous composite material section.

If locally reduced mechanical strength (week areas) thus needs to be designed into a composite material, e.g. for a component to break under a certain predetermined load condition, there has been provided a simple controlled way to achieve this.

The introduction of nano additives can also be used to create local weaknesses in the composite structure, which are needed in some applications for example to have controlled areas where the structures can fail.

By using additional resin in form of a film, the fiber volume of the article can be varied within large tolerances.

By using different heights of the mats, different density of the mats and different directions of the nano-sized fiber-like reinforcement elements between the pre-preg plies, optimizing of the structure of an aeronautical composite structure is provided.

Suitably, an arrangement of set of nano-sized fiber-like reinforcement elements are provided in the plane of the ply and in radial direction or in any pattern where a hole will be located (e.g. bolt hole) of the composite material.

Preferably, prolonged (1-10 mm or more) nano-sized fiber-like reinforcement elements are grown to reinforce the composite material.

Different measures (i.e. both prolongation and density) of the nano-sized fiber-like reinforcement elements can be used for different objects, such as increasing/decreasing conductivity, increasing/decreasing strength, etc.

Suitably, during the production of the composite material, "standing-up" nano-sized fiber-like reinforcement elements are forced to lay down.

In such way is achieved that high loads can be carried in bolt bearing.

Preferably, one or more layers of such type of nano-sized fiber-like reinforcement elements can be arranged in the bolt area between two plies.

Alternatively, one or more layers of such type of nano-sized fiber-like reinforcement elements can be arranged together with graphene and randomized nano sized fiber-like reinforcement in the bolt area between two plies and/or in the bolt area on the surface of the composite article.

In one embodiment, the step of arranging aligned CNT's as above in combination with randomized CNT's mixed in a sheet of resin.

Suitably, strength properties can be optimized by taking into account the stacking sequence.

Alternatively, the nano-sized fiber-like reinforcement elements are distributed circumferentially around and having an extension in radial direction of a fastener hole between each pair of pre-preg plies and/or on the surface.

Alternatively, the nano-sized fiber-like reinforcement elements are distributed in non-circumferentially pattern around and having an extension in radial direction or other optimized direction of a fastener hole between each pair of pre-preg plies and/or on the surface.

The bolt bearing strength will thus be improved significantly.

Suitably, additional resin can be applied to the nano-sized fiber-like reinforcement elements by the addition of a resin film.

The added nano-sized fiber-like reinforcement elements will further optimize the structural strength of the hole regarding bolt bearing capability. The sheet could for example be placed between layers of knocked down aligned CNT's.

Preferably, a combination of "standing-up" and laid down nano-sized fiber-like reinforcement elements is provided.

Alternatively, a combination of "standing-up" and laid down nano-sized fiber-like reinforcement elements is provided with/or without graphene and/or randomized nano.

In such way being optimized each and every hole individually (or group of holes) based on the loads and stacking sequence.

Suitably, clearance fit holes, close fit holes or interference holes of a composite material (e.g. aircraft structure) can have different optimization.

In such way is achieved a composite material involving high bolt bearing strength. The strength can thus be challenging metallic materials for aircraft. Such improvement of this critical property will also lead to significant weight and cost savings.

Preferably, the radius of the composite material being added with stitched nano-sized fiber-like reinforcement elements.

In such way is achieved an improved (by stitching e.g. CNTs in the radius of e.g. C-frames during the production of the composite material) laminate quality in a complementary way. The nano-sized fiber-like reinforcement element stitching improves the intralaminar tension-strength (peel) in the radius of e.g. C-frame and improves also the load carrying capacity. The nano stitching will also, within the radius, keep the matrix resin in the radius. The nano stitching will improve the required thickness tolerance in the radius area.

In such way is achieved an elimination or reduction of the thinning of the radius during the curing process during production of the composite material. Such thinning of the radius would otherwise reduce the load carrying capacity.

In such a way that there is achieved an elimination of thickening in the area where the radius continue to e.g. a flat section.

By locally removing/absorbing resin from the pre-preg plies the micro-sized reinforcement elements (e.g. carbon fibers) close to the nano-sized fiber-like reinforcement elements can be used as a barrier, which prevents the resin to freely flow in the transverse direction.

This will simplify the production of the composite material. For example, the forming of constant radius will achieved in a more controllable manner.

In such way is achieved that a curing of the composite material (lay-up) can be carried out using standard processing or a process adjusted regarding curing pressure, vacuum levels and processing time and steps as needed in order to obtain a required laminate quality with a pre-selected integrity of the added nano-sized fiber-like reinforcement elements.

In such way a dry mat (such as a CNT mat) positioned between two pre-preg plies will serve as a vacuum channel. Such functionality will provide the possibility to use fully impregnated (with resin) pre-preg plies, which in turn means a cost-effective and simplified manufacturing process also being robust. The use of fully impregnated pre-preg plies implies that the bulk factor, i.e. the ratio (thickness difference) between a thickness of a lay-up of uncured/semi-cured pre-preg plies and the thickness of a finished composite material (laminate), will be closer to 1.0. The use of fully impregnated pre-preg plies implies a cost-effective and simple process. Current used "less impregnated" pre-preg plies with high bulk factors, typically about 1.02-1.20 (prior art bulk factor) involves effects of both internal air (unimpregnated internal volumes or air channels) and entrapped air between the pre-preg plies in the lay-up.

Preferably, dry nano-sized fiber-like reinforcement element mats can be used for achieving extremely high bulk factors.

In such way the nano-sized fiber-like reinforcement element mat (e.g. CNT mat) can be used as an internal vacuum channel in the pre-preg lay-up for the use of fully impregnated pre-preg plies. Fully impregnated pre-preg plies imply that the thickness of the lay-up corresponds to the thickness of the finished composite material (laminate) after curing. This simplifies the forming and curing of pre-preg lay-ups into articles and also the manufacture procedure as the finished article will have corresponding measurement as used forming tools.

The bulk factor will thus be lower due to the use of nano-sized fiber-like reinforcement element mats (such as CNT or MWCNT mats of different architecture) in the pre-preg lay-up. Thereby also the cured composite material (laminate) quality will have low porosity. At the same time the manufacturability of complex shape structures will be improved.

Preferably, a step of repeating the above-mentioned steps claimed in the independent method claim is made with or without the application of nano-sized fiber-like reinforcement elements for providing the lay-up. The nano-sized fiber-like reinforcement elements may comprise graphene and/or random orientation of the nano-sized fiber-like reinforcement elements.

Suitably, every second ply is laid with the application of nano-sized fiber-like reinforcement elements (in a mat or separately).

In such way is achieved that the use of easy-to-process pre-preg materials having a pre-preg ply thickness nearly equal to the cured laminate ply thickness (low "bulk factor").

Preferably, the step of applying the nano-sized fiber-like reinforcement elements is preceded by the step of heating the ply onto which the elements are to be applied.

Alternatively, the nano-sized fiber-like reinforcement elements per se are heated for providing said step of heating the ply.

Suitably, the nano-sized fiber-like reinforcement elements may constitute a dry nano-sized fiber-like reinforcement element mat or a semi-dry nano-sized fiber-like reinforcement element mat.

Preferably, in order not to subject the mats for excessive pressure that might cause the aligned nano-sized fiber-like reinforcement elements to buckle and crush, a carefully adjusted lay-up procedure and pre-preg compaction cycle is applied.

Alternatively, measures can be introduced that rapidly heats the adjacent pre-preg layers in order to impregnate the dry mat immediately after positioning on the pre-preg surface. One such rapid heating method is to resistively heat the dry mat by applying current (AC or DC) through the mat. Another heating method, which can be used as stand alone or in combination with resistive heating, is infrared (IR) heating.

Preferably, the ply comprises resin pre-impregnated fibers.

Suitably, the nano-sized fiber-like reinforcement elements constitute a mat to be applied onto the ply.

Alternatively, the nano-sized fiber-like reinforcement elements are positioned in pre-determined areas of the lay-up.

In such way the nano-sized fiber-like reinforcement elements also prevent resin to flow in the surface area between two prepeg sheets.

Suitably, the nano-sized fiber-like reinforcement elements are parts of a nano-sized fiber-like reinforcement element mat (such as nano-engineered arrangements of CNT mats, e.g. vertically aligned MWCNT mats), each mat being positioned in between selected individual plies of uncured pre-preg plies. These mats can be placed in selected locations in the pre-preg lay-up, e.g. locally or in any suitable position in the lay-up. The nano-sized fiber-like reinforcement elements may comprise graphene and/or random orientation of the nano-sized fiber-like reinforcement elements.

Preferably, during the curing cycle, the added nano-sized fiber-like reinforcement element mats are functioning as temperature sensors and/or sensors for resin flow, gelation and degree of curing.

This can be achieved by running a current through designated nano-sized fiber-like reinforcement element mats (e.g. CNT mats) in the lay-up for monitoring the resistivity or other appropriate property. Resin gelation and cure will also affect the resin electrical conductivity.

Suitably, the method further comprises the step of (during the cure cycle) application of a high static electrical field to the lay-up in order to force the fibers (e.g. micro-sized reinforcement carbon fibers) of the fiber reinforcement in respective ply to repel from each other during a period of the cure cycle. This will allow the nano-sized fiber-like reinforcement elements (e.g. CNT's) to more easily penetrate in between the carbon fibers.

Alternatively, the method further comprises the step of (during the cure cycle) application of a high static electrical field to the lay-up in order to force the fibers of the fiber reinforcement in respective ply to repel from each other during a period of the cure cycle. This will allow the pre-preg plies to have a higher interlaminar and/or intralaminar strength.

Preferably, non-destructive inspection (NDI) is carried out after the curing. The addition of the nano-sized fiber-like reinforcement elements (such as CNTs) in the laminate facilitates NDI in a number of different ways. In case of through-transmission ultrasonic inspection, CNT mats of vertically aligned MWCNT will significantly reduce ultrasound damping in case of a defect-free laminate. This will improve detection of defects with a minor effect on transmission, which would otherwise be difficult to detect.

Relatively thick CFRP laminates can thereby be inspected more efficient after curing.

NDI methods based on heat transfer, such as shearography, will also be enhanced by use of heat-conductive CNT additions in the laminate.

In one embodiment, the step of arranging the CNT or MWCNT in the radius of a curved CFRP structure can be carried out in order to improve the structural strength in the radius and ease the manufacturing process.

One is that the aligned CNTs will prevent or reduce the common radii thinning that can take place due to geometric and process effects when curing a curved CFRP article on a male tool under a vacuum bag with or without autoclave pressure.

The CNTs also prevent or reduce resin flow in the interface area between two prepeg plies.

In such way is achieved that heating and cooling steps during the CFRP article curing cycle will be possible to run at a shorter time, especially for thick laminates.

Many of the processing limitations or difficulties currently associated with manufacturing of CFRP structures can thereby be resolved or simplified.

In such way it is possible to control the finished cured composite material (laminate) thickness within an area having a complex curvature radius.

A composite material (e.g. CFRP) according to the invention can thus be made extremely accurate regarding shape and required laminate thicknesses, which will result in improved strength compared to currently used technologies.

Preferably, the controlling of the spacing of micro-sized reinforcement fibers and the coupling to the nano-sized fiber-like reinforcement elements being made by adding of a static electric voltage of sufficient size or an AC during a window of the cure cycle, where lower viscosity prevails for the resin being cured, for enforcing separations between the micro-sized reinforcement elements. The voltage is thus applied to a later part of the cure process. This means that there is a possibility to create a window, where the nano-sized fiber-like reinforcement elements may penetrate deeper into the pre-preg plies, wherein they will not be hindered by an upper-most layer of micro-sized reinforcement elements carbon fibers embedded in the resin ply.

BRIEF DESCRIPTION OF THE FIGURES

The present invention will now be described by way of examples with references to the accompanying schematic drawings, of which:

FIGS. 9a-9d illustrate further aspects of producing the composite material;

FIGS. 10a-10e illustrate one aspect of producing the composite material;

FIG. 12a illustrates prior art;

FIGS. 13a-13b illustrate one aspect, wherein bolt bearing strength of the composite material being optimized;

FIGS. 14a-14c illustrate different aspects for producing composite materials having different properties;

FIGS. 15a-15b illustrate flow charts according to two aspects of the inventive method.

DETAILED DESCRIPTION OF VARIOUS EMBODIMENTS

Hereinafter, embodiments of the present invention will be described in detail with reference to the accompanying drawings, wherein for the sake of clarity and understanding of the invention some details of no importance may be deleted from the drawings. Also, the illustrative drawings show fiber structures of different types, being illustrated extremely exaggerated and schematically for the understanding of the invention. For example, the nano-sized fiber-like reinforcement elements are illustrated exaggerated in figures also for the sake of understanding of the orientation and the alignment of the nano-sized fiber-like reinforcement elements. The number of plies (e.g. pre-preg plies) stacked on top of each other for forming the composite material can be 2-60 or even more such as up to 120 or more.

Figure 1:
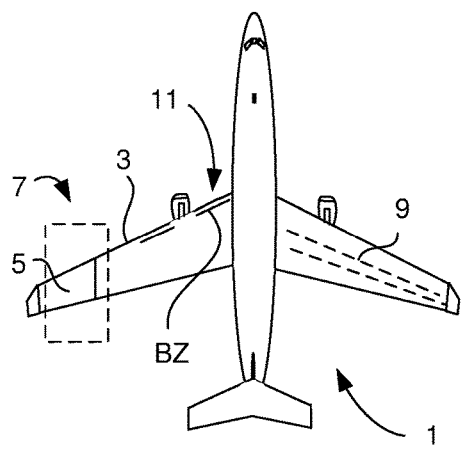
FIG. 1 illustrates an aircraft making use of composite material according to one embodiment having micro-sized reinforcement element distributions and between these distributions are arranged nano-sized reinforcement elements.

FIG. 1 schematically illustrates an aircraft 1 comprising a wing 3. An upper skin 5 (article) of the aircraft wing 3 is made of a composite material 7 according to one aspect of the present invention. Stringers 9 (article) are made of composite material 7 according to one aspect of the invention. A leading edge 11 (article) of the composite material 7 comprises a third aspect of the invention, wherein a breakable zone BZ is provided. The aircraft may include articles having several aspects of the invention.

An article may have at least one composite material, comprising matrix material and micro-sized reinforcement element distributions, each being arranged in a respective ply provided on top of each other. The nano-sized reinforcement elements (e.g. CNTs) are arranged in between and/or inside the micro-sized reinforcement element (e.g. CFRP) distributions and/or on at least one side of the outer surface, the nano-sized reinforcement elements having matrix material accumulation properties so as to provide a tailored increased reinforcement volume of said distributions.

This aircraft 1 shown in FIG. 1 uses at least one article 5, 9, 11 comprising at least one composite material 7, comprising matrix material (not shown) and micro-sized reinforcement element distributions (not shown), each being arranged in a respective ply (not shown) provided on top of each other, wherein nano-sized reinforcement elements (not shown) are arranged in between the micro-sized reinforcement element distributions, the nano-sized reinforcement elements having a matrix material accumulation properties so as to provide an increased micro-sized reinforcement volume density of micro-sized reinforcement element distribution volume of the composite material 7. The article 5, 9, 11 is an aeronautic article being used for electrical and/or thermal and/or strength and/or elongation and/or strength build-up properties.

Figure 2:
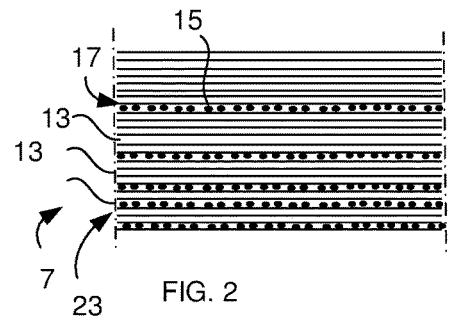
FIG. 2 illustrates a cross-section of a composite material in FIG. 1 comprising fiber plies arranged on top of each other.
Figure 3:
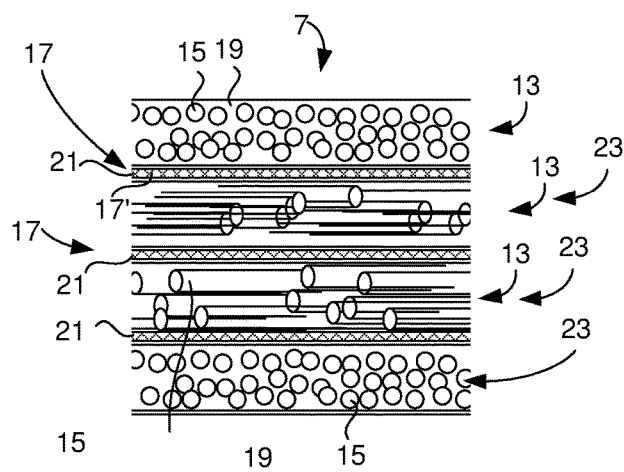
FIG. 3 illustrates a close view of the composite material taken in cross-section according to one aspect where micro-sized reinforcement element distributions also comprises nano-sized reinforcement elements.

FIGS. 2 and 3 illustrate a cross-section of a composite material 7 of a further type of article according to one aspect shown in FIG. 1, wherein the composite material 7 comprises fiber plies 13 (e.g. used for common CFRP, i.e. carbon fiber, i.e. micro-sized reinforcement elements, reinforced plastic) arranged on top of each other. Each fiber ply 13 (in this case so called pre-preg plies or preimpregnated fiber plies) thus comprises micro-sized reinforcement elements, such as carbon fibers 15 as shown in FIG. 2. The pre-preg plies 13 are made of reinforcement fibers which are impregnated with a thermoset resin matrix in a certain ratio. The ratio is such that the fiber volume within the single pre-preg ply 13 is relatively high for providing certain properties of the pre-preg ply 13, as the plies 13 will be cured under high temperature and pressure during production of the composite material 7 for achieving full polymerization. One of such certain property of a separate pre-preg ply 13 being that it is partially cured (semi-cured) for ease of handling during said production (so called B-stage).

The nano-sized reinforcement elements 17 (e.g. CNTs) are arranged in between and/or inside the micro-sized reinforcement element (e.g. CFRP) distributions 23, the nano-sized reinforcement elements 17 having matrix material accumulation properties so as to provide a tailored increased reinforcement volume of said distributions 23.

The term micro-sized reinforcement element herein is used for such fiber embedded in the respective ply, wherein the diameter of the fiber could be typically 5-25 μm or more, depending on type of fiber.

The article partly shown in FIG. 3 comprises at least one composite material 7, comprising matrix material and micro-sized reinforcement element distributions 23 of carbon fibers 15, each distribution 23 being arranged in a respective ply provided on top of each other. The nano-sized reinforcement elements 17 (e.g. CNTs) are arranged in between and/or inside the micro-sized reinforcement element distributions 23, the nano-sized reinforcement 17 elements having matrix material accumulation properties so as to provide a tailored increased reinforcement volume of said distributions 23. The content of the nano-sized fiber-like elements 17 is so high that the resin 19 of the plies 13 has been absorbed (during curing) by the nano-sized fiber-like element 17 arrangement, thereby increasing the fiber volume of the composite material 7. FIG. 3 illustrates a close view of the composite material 7 taken in cross-section according to one aspect. The number of pre-preg plies 13 can be 2-100 or other number depending upon application. Each pre-preg ply 13 comprises plastic 19 (before curing defined as resin) and micro-sized reinforcement carbon fibers 15. The direction of the carbon fibers 15 extends in the plane of the composite material 7. The extension of the carbon fibers 15 in each ply 13 differs from the direction of carbon fibers 15 in an adjacent ply 13. However, the direction can also be the same in adjacent plies 13. Each pre-preg ply 13 has been added with a dry CNT 17' (carbon nano tube) mat 21 on its free side during the lay-up procedure and prior curing.

Figure 4:
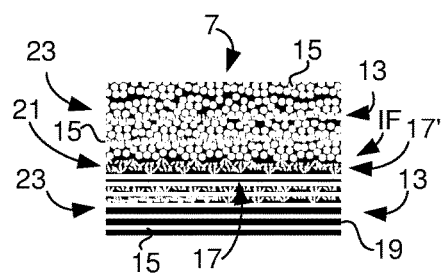
FIG. 4 illustrates an even closer view of the cross-section in FIG. 3.

FIG. 4 illustrates the composite material 7 comprising the plastic 19 and the carbon fiber 15 reinforcement in FIG. 3. FIG. 4 shows more in detail that the composite material 7 of the article comprises a plurality of carbon fiber 15 accumulations or distributions 23. Each carbon fiber 15 distribution 23 is arranged in a respective ply 13 (layer). The plies 13 are arranged on top of each other. The CNTs 17' of the CNT mat 21 are arranged in between the carbon fiber 15 accumulations 23 of two adjacent plies 13. In FIG. 4 is shown that the carbon fiber 15 volume being increased near the interface IF of the two plies 13 due to the absorption of resin from adjacent ply 13 into the CNT mat 21 during production of the composite material 7 and curing procedure. The CNTs 17' exhibit a direction essentially orthogonally to the plane of the ply 13. The nano-sized reinforcement elements 17 (e.g. CNTs 17') are arranged in between and/or inside the micro-sized reinforcement element (e.g. CFRP) distributions 23, the nano-sized reinforcement elements 17' having matrix material accumulation properties so as to provide a tailored increased reinforcement volume of said distributions 23. Thereby is achieved that the fracture toughness of the composite material 7 is improved, since the plastic 19 also being reinforced by the CNTs 17'. Thereby the interlaminar shear and/or intralaminar tension and/or tension strength of the cured resin has been improved. The composite material 7 can be made thinner than prior art composite material still providing the same strength, whereby aircraft can be built with relative low weight, which is environmentally friendly. At the same time being achieved that the electrical conductivity of the composite material 7 (predominantly in the transverse direction to the extension of the composite material 7) will be improved at the same time, whereby the CFRP material at the same time (as it saves weight) can be used for different functionalities of the aircraft, such as part of a lightning protection system, de-icing/anti-icing system, etc. By the absorption of resin 19 from the adjacent pre-preg plies 13, the carbon fibers 15 positioned (being most compact) nearest the CNTs can be used as a barrier in predetermined areas of the composite material 7. During production, this feature prevents the resin to freely flow in the transverse direction and this will simplify the production of the composite material 7. For example, the forming of radius with closer tolerances will be achieved in a more controllable manner.

Figure 5A:
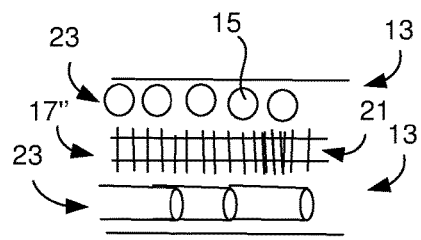
FIGS. 5a-5d illustrates different embodiments of articles having nano-sized fiber-like reinforcement elements exhibiting an extension orthogonally (or parallel) to the plane of the ply or randomly oriented.

FIG. 5a illustrates nano-sized fiber-like reinforcement elements (in this embodiment graphene 17'') exhibiting a direction orthogonally (or parallel, see FIG. 5d) to the plane of the ply 13, wherein the micro-sized reinforcement elements (e.g. carbon fibers) 15 of the distribution 23 partially being branched and surrounded by the graphene elements 17''. The nano-sized reinforcement elements 17'' are arranged in between and/or inside the micro-sized reinforcement element distributions 23, the nano-sized reinforcement elements 17'' having matrix material accumulation properties so as to provide a tailored increased reinforcement volume of said distributions 23. Thereby specific properties (such as thermal/electrical conductivity and/or mechanical properties) can be determined when producing the composite material 7. The properties can thus be set from the desired functionality of the composite material 7. The graphene elements 17'' positioned inside the micro-sized reinforcement element distributions 23 will also hold and keep the distance between the carbon fibers 15 of the orthogonally graphene elements 17'' during production (curing). The transverse couplings (electrically and/or thermally and/or mechanically) between the plies 13 thus being provided by means of the orthogonally oriented graphene elements 17''.

Figure 5B:
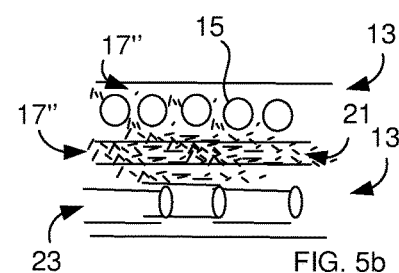

FIG. 5b illustrates a cross-sectional portion of an article according to a further embodiment. The article comprises a composite material made of a cured resin material 19 and micro-sized reinforcement element distributions 23. CNTs 17'' are arranged as randomly dispersed CNTs 17'' in between and inside the distributions 23. The CNTs 17'' having matrix material accumulation properties so as to provide a tailored increased reinforcement volume of said distributions 23.

Figure 5C:
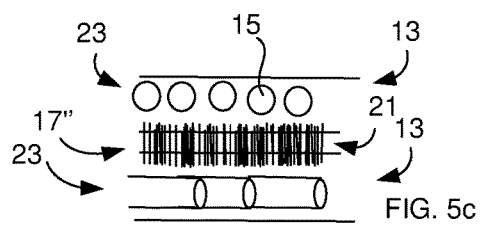
Figure 5D:
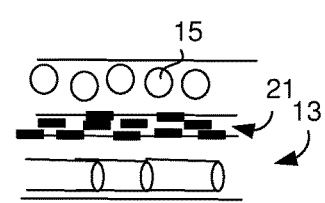

FIG. 5c illustrates a cross-sectional portion of an article according to a further embodiment. The article comprises a composite material made of a cured resin material 19 and micro-sized reinforcement element distributions 23. Nano fibers 17'' are arranged orthogonally to the plane of the plies 13 in between the distributions 23. The Nano fibers 17'' having matrix material accumulation properties so as to provide a tailored increased reinforcement volume of said distributions 23.

Figure 6:
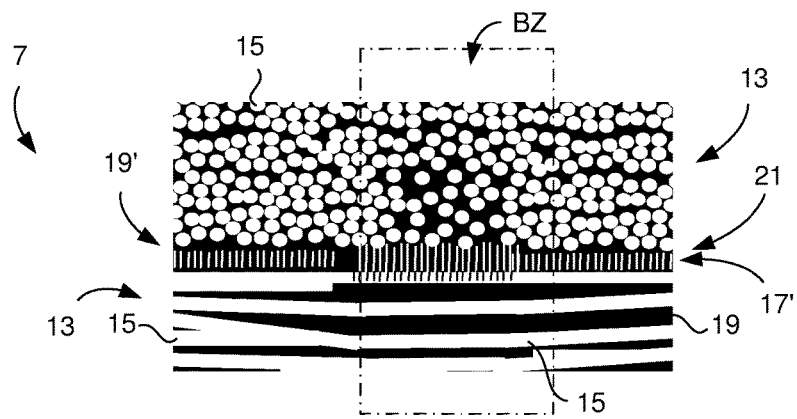
FIG. 6 illustrates a close view of a cross-section of a composite material of an article according to one aspect.

FIG. 6 illustrates a detailed cross-section of a composite material 7 according to a further aspect according to one aspect. In this embodiment the CNT-mat 21 has been impregnated with a resin 19' for the production (before curing) of the composite material 7. The resin 19' of the CNT-mat 21 is of the same or different composition as that of the pre-preg plies 13. The amount of resin 19' of the CNT-mat 21 is pre-determined for achieving one or several specific properties of the composite material 7. In this embodiment there is achieved a breakable zone BZ. The height of the CNTs 17' of the impregnated CNT-mat 21 (each mat 21 being applied in between two pre-preg plies 13) will determine the amount of resin 19 that will be drawn out from the adjacent pre-preg plies 13. The breakable zone BZ is achieved by locally reduction of mechanical strength (week area). This is achieved by increasing the height of the CNTs 17' within the breakable zone BZ. As the absorption of resin 19 from the pre-preg plies 13 will be less within the breakable zone BZ, due to the higher height of the mat 21. By the use of the two parameters—first parameter being CNT height of a resin impregnated CNT-mat and the second parameter being resin volume of the resin impregnated CNT-mat—there has been provided an efficient way to control the properties of the composite material 7. The property feature may involve a single property or multi-functional properties. By the use of additional resin 19' for impregnating the CNTs 17', the carbon fiber volume can be varied within large tolerances.

Figure 7A:
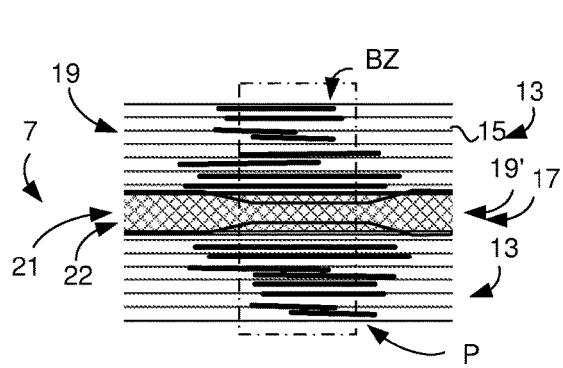
FIGS. 7a-7b illustrate cross-sections of articles according to further aspects.

FIG. 7a illustrates one embodiment where dry Nano Cones 17 have been applied in an additional resin film for controlling the absorption of resin from the pre-preg plies. The FIG. 7a illustrates a cross-section of a composite material 7 of an article. As an example, a breakable zone BZ is provided by arranging a locally porous P section in this zone. The amount of resin 19' impregnating Nano Cones 17 in the mat 21 is locally decreased in this zone. Otherwise, the amount of resin 19' impregnating the Nano Cones 17 in the mat 21 for the composite material 7 being determined such that the absorption of resin 19 from the pre-preg plies 13 into the mat 21 being optimally determined for increasing the carbon fiber 15 volume. By decreasing the amount of determined amount of resin 19' in the mat 21 there will be less resin, wherein pores P will be provided. The achieved porosity P (due to lack of resin) will define the breakable zone BZ. By using additional resin 19' impregnating the elements 17 in form of a film 22, the reinforcement microsized reinforcement fiber 15 volume can vary within large tolerances.

Figure 7B:
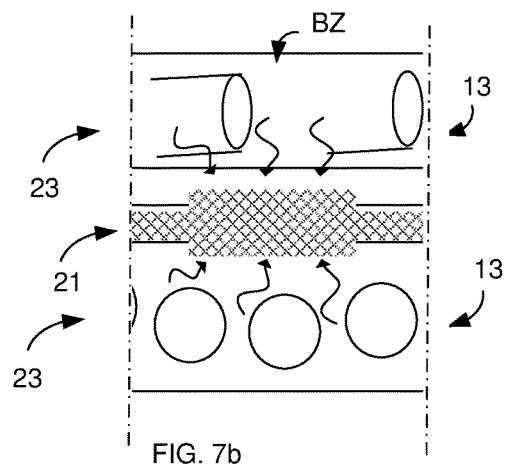

FIG. 7b illustrates according to a further embodiment a cross-section of an article, where dry CNT mats (pure content of nano-sized fiber-like reinforcement elements and no resin) have been applied onto the respective pre-preg surface for absorbing the resin from the micro-sized reinforcement element distributions 23.

Figure 7C:
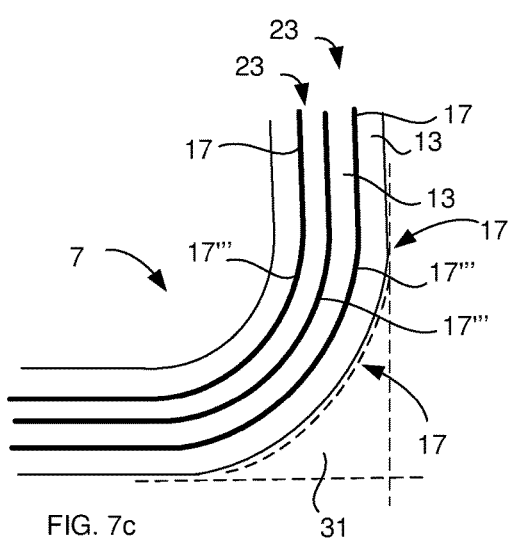
FIG. 7c illustrates a radius section of an article according to one aspect.

FIG. 7c illustrates a radius section of the composite material 7. The radius section being added with nano-sized fiber-like reinforcement elements 17, in this embodiment so called nano fibers 17'''. In such way is achieved an improved (such as CNT mat) laminate quality in a complementary way. The nano fibers improve the intralaminar tension-strength (peel) in the radius and improves also the load carrying capacity. The nano fibers will also, within the radius section, keep the resin (by means of more packed nano fibers between the micro-sized reinforcement element distributions 23 in pre-determined zones) within the area of the radius, wherein it is achieved that no thinning of the radius (during the curing process) will occur. At the same time as weight saving can be achieved in the radius section by means of the high carbon fiber volume provided by the nano-sized fiber-like reinforcement elements 17 positioned in between the plies 13 (and micro-sized reinforcement element distributions 23) and being arranged for absorption of the resin from the plies, controlled thinning of the radius section will thus occur. The radius section in this example is a portion of an intra-noodle or noodle interface, which is bond to a surrounding structure. The noodle 31 can be a reinforcing structure part of a blade- or I-stiffened panel (not shown). The CNTs thus improve the shear strength between two pre-preg plies either intra-noodle or noodle interface to said surrounding structure. One mechanism is that the CNTs reduce the temperature loads from the resin layers between two pre-preg sheets either intra-noodle or noodle interface to surrounding structure. One mechanism is that the CNTs improve the resin layers peel strength between two pre-preg sheets either intra-noodle or noodle interface to surrounding structure. One mechanism is that the CNTs improve the resin layers tension strength between two pre-preg sheets either intra-noodle or noodle interface to surrounding structure.

Figure 8:
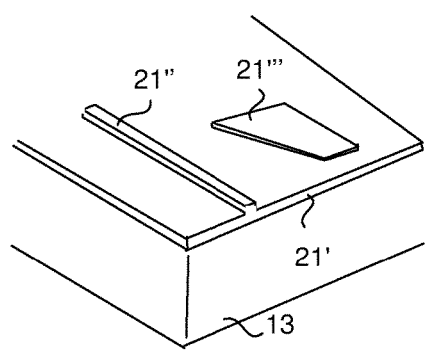
FIG. 8 illustrates a perspective view of nano-sized fiber-like reinforcement element mats applied onto a pre-preg ply according to one aspect.

FIG. 8 illustrates a perspective view of nano-sized fiber-like reinforcement element mats 21', 21", 21''' applied onto a pre-preg ply 13 according to one aspect. A base nano-sized fiber-like reinforcement element mat 21' of a first thickness has been applied onto the pre-preg ply 13. A second nano-sized fiber-like reinforcement element mat 21" of a second thickness and a third nano-sized fiber-like reinforcement element mat 21''' of a third thickness have been applied onto the base nano-sized fiber-like reinforcement element mat 21'. By using different heights of the nano-sized fiber-like reinforcement element mats, different density of the nano-sized fiber-like reinforcement element mats and different directions of the nano-sized fiber-like reinforcement elements between the pre-preg plies 13, optimizing of the composite material 7 is provided. There is thus provided an efficient way to control pre-determined properties of the finished composite material 7, e.g. conductivity, breakable zones, partial strengthening of laminate, sensor functionality, tailored lay-up for complex radius curvature, etc.

Figure 9C:
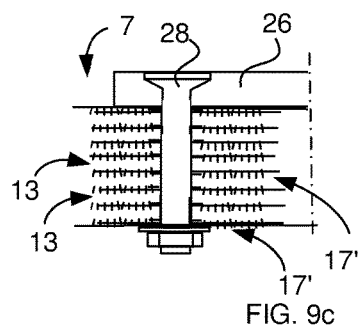

FIGS. 9a-9d illustrate further aspects of the invention. FIG. 9a illustrates a production step comprising forcing the nano-sized fiber-like reinforcement elements 17 (such as CNTs) to "lay down" in a direction transverse to a center line CL of a planned bore hole 33 in the composite material 7. The nano-sized fiber-like reinforcement elements 17 are arranged in the plane of the ply 13 and in radial direction of the bore hole 33. A robot arm 35 moves a scrape 37 (blade) towards the center line CL. This procedure is repeated for each ply 13. In this embodiment there are also provided a set of prolonged nano-sized fiber-like reinforcement elements 17'''', which are grown on a substrate to reinforce the composite material within the area of the bore hole 33. In such way is achieved that high loads can be carried in bolt bearings having significantly improved bearing strength. The production of the composite material 7 thus involves that "standing-up" nano-sized fiber-like reinforcement elements 17 are forced to "lay down" in the radial direction towards the bore hole 33 wall. In this embodiment a plurality of layers comprising nano-sized fiber-like reinforcement elements 17 is arranged in the bore hole 33 area between the plies 13. The strength properties in the bore hole 33 area are also optimized by taking into account the stacking sequence of pre-preg plies 13. The "lay down" nano-sized fiber-like reinforcement elements 17 are also distributed on the surface S of the composite material 7 according to this embodiment. Of course, a combination of "standing-up" and laid down nano-sized fiber-like reinforcement elements 17 can be provided. In such way being optimized that each and every hole is individually based on the loads and also stacking sequence. There being thus a possibility to provide high strength clearance fit holes or close fit holes in the composite material 7 having different optimization. FIG. 9a thus illustrates nano-sized fiber-like reinforcement elements 17 being knocked down (tilted or sheared down to a horizontal position from an original vertical position, e.g. by using a moving blade held at an oblique angle) and directed in the radius direction or other directions of the hole. The nano-sized fiber-like reinforcement elements 17 around a hole could be placed in such a way that resin from the pre-preg ply 13 will be reduced to locally increase the fiber 15 volume of the plies 13 in the vicinity of the hole. FIG. 9b illustrates the production of a composite rib foot RF. In the area of rib fastening holes 34 the nano-sized fiber-like reinforcement elements 17 are tilted in a direction towards the fastening holes 34. The lay-up is co-cured together with a wing skin 39. Subsequently before mounting it to a rib (not shown), the composite material 7 is penetrated by a drill within said area for making the fastening holes 34. FIG. 9c illustrates a composite material 7 comprising a hole for bolts 28 (only one is shown) for joining the composite material to a metal skin 26. The hole area comprises CNTs 17' directed towards the wall of the hole, which CNTs 17' in majority ends at the hole wall and which are positioned in between each ply 13. FIG. 9d illustrates a bolt hole 36 through which a bolt 41 extends. The bolt hole 36 exhibits larger diameter than the bolt 41. The bolt hole 36 in this case is made for "open hole compression type" load, wherein the loads L are extremely high in outermost portions of the bolt hole 36 near composite surface 43. The bearing properties depend on the angle of the bolt center line CL' relative the normal N to the composite material 7 extension. The composite material 7 comprises upper 13U and lower plies 13L comprising carbon fibers 15. For strengthening the bolt hole 36, the upper 13U and lower plies 13L within the area of the bolt hole 36 are provided with prolonged CNTs 17' (long grown CNTs), which are oriented in radially direction towards the bolt hole 36 and extended in a plane parallel with the extension of the plies 13. Some of upper plies 13U comprise interleaved CNTs 17' strengthening the composite material 7. Some of the lower plies 13L comprise interleaved CNTs 17' strengthening the composite material 7. During curing, these CNTs 17' will also serve as a barrier permitting the resin of intermediate plies 13i to flow more freely in one direction thereby promoting an effective forming procedure. The knocked down CNTs 17' will be placed on the top and bottom surface of the CFRP structure in this embodiment. Of course, in other embodiments all of (or a majority of or proper amount of) CNTs positioned adjacent the planned hole be knocked down CNTs 17' (See e.g. FIG. 9c showing such embodiment wherein all of the hole edge positioned CNTs are knocked down). Such improved bolt 41 bearing load capability will give a structure with lower weight and manufacturing cost as no additional strengthening devices (e.g. brackets) have to be added. One aspect involves that the step of arranging aligned CNTs 17' is made in combination with randomized CNTs 17 mixed in a mat of resin. The added mechanism will thereby be to further optimize the structural strength of the bolt hole 36 regarding bolt 41 bearing capability. The mat could for example be placed between layers of knocked down aligned CNTs. The step of arranging the CNTs (or MWCNT) in between pre-preg plies 13 of a CFRP material is made in order to improve the structural strength and ease the manufacturing process.

FIGS. 10a-10e illustrate one aspect of producing the composite material 7, which comprises a plastic and a fiber reinforcement 15 having a plurality of fiber distributions 23, each being arranged in a respective ply 13 provided on top of each other, wherein the composite material 7 further comprises nano-sized fiber-like reinforcement elements 17 there between, the method includes the steps of providing the fiber distribution 23 of a first ply 13'; applying the nano-sized fiber-like reinforcement elements 17 onto the first ply 13'; applying a next fiber distribution of a second ply 13" onto the nano-sized fiber-like reinforcement elements 17; applying further nano-sized fiber-like reinforcement elements 17 onto the second ply 13"; repeating of the preceding steps until a lay-up 45 is provided for the finished composite material; and curing of the lay-up 45. FIG. 10a illustrates an automatic tape laying apparatus ATL applying the first pre-preg ply 13' onto a male tool MT. FIG. 10b illustrates automatic application of a dry nano-sized fiber-like reinforcement element mat 21 by means of a nano tape applicator 20 onto the first pre-preg ply 13'. The resin of the pre-impregnated carbon fiber distribution 23 of the first ply 13' being absorbed by the mat 21. The distribution 23 of carbon fibers (15) will thus exhibit higher fiber volume in said ply 13'. FIG. 10c illustrates the next step of applying a second pre-preg-ply 13" comprising a next carbon fiber distribution. FIG. 10d illustrates the next step of application of a second nano-sized fiber-like reinforcement element mat 21" onto the second pre-preg ply 13" wherein the fiber volume of the second ply 13" will increase. FIG. 10e illustrates a following step of application of a third pre-preg ply 13'''. The lay-up 45 can include further mats or may be produced by the application of further plies 13 with or without further nano-sized fiber-like reinforcement element mats 21, and when the lay-up 45 is completed, the lay-up 45 is cured under heat and pressure in an autoclave or oven (not shown).

Figure 11:
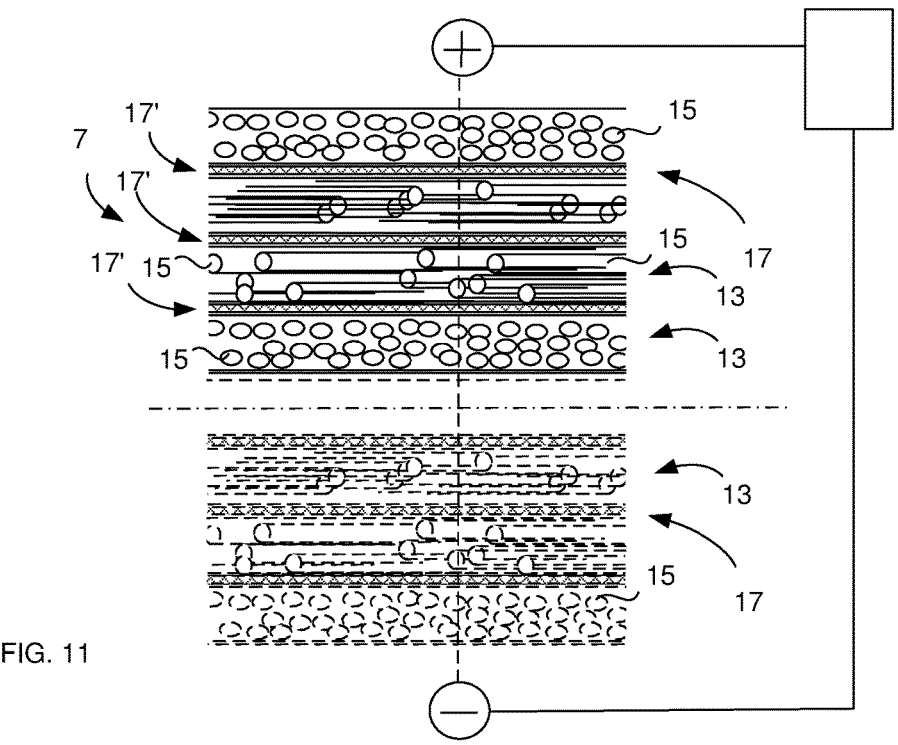
FIG. 11 illustrates one aspect of the method making the high fiber volume composite material.

FIG. 11 illustrates one aspect of the method for cost-effective production of the high fiber volume composite material 7. By applying a current through CNTs 17' in the lay-up 45, the production can be monitored in regard to temperature, resin flow, gelation and degree of curing. The added nano-sized fiber-like reinforcement elements 17 are thus functioning as temperature sensors and/or sensors for resin flow, gelation and degree of curing. Resin gelation and cure will also affect the resin electrical conductivity and can thus be monitored. The FIG. 11 may also be used to illustrate the use of the finished composite material 7, wherein the high carbon fiber 15 volume in combination with CNTs 17' arranged in between the plies 13 will promote the property of high electrical (also thermal) conductivity transverse the direction of the plies 13.

Figure 12A:
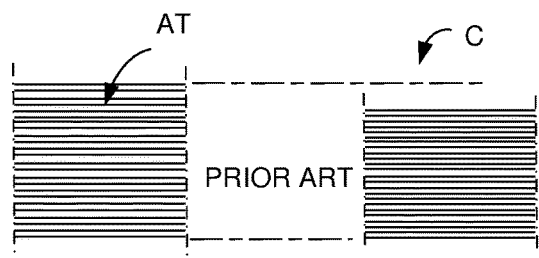
FIGS. 12a-12b illustrate the improvement of bulk factor, where
Figure 12B:
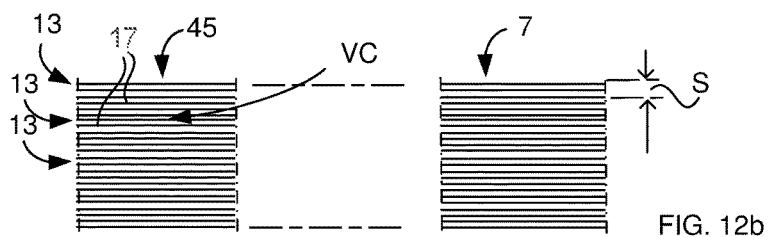

FIGS. 12a-12b illustrate the principle of the improvement of the bulk factor according to one aspect. Current lay-up (of pre-preg plies) resin in plies, such as shown in FIG. 12a (PRIOR ART), is made with some porosity for achieving an air (or gases) transport AT through the lay-up under forming and curing. The air (or gases) transport AT is important for evacuating eventual trapped air in the lay-up during forming of the lay-up into a laminate. This means that the thickness of a cured and finished prior art composite C will be less than the uncured lay-up thickness. The not fully impregnated resin will make that the PRIOR ART lay-up during compression and evacuating will become thinner.

However, according to one aspect of the present invention, due to the added nano-sized fiber-like reinforcement elements 17, the fiber volume of the lay-up, shown in FIG. 12b, within the plies 13, will be relatively high at the same time as the added nano-sized fiber-like reinforcement elements 17 (during the evacuating step of the forming procedure) will serve as vacuum channels VC for above-mentioned air transport. As such vacuum channels VC are provided for the purpose for air transport, the pre-preg plies do not need to be not fully impregnated and therefore no thin out of the lay-up occurs during the evacuation and compression/curing. Such property of the lay-up 45 will promote an efficient production of composite material 7 used in manufacture of aeronautical articles, since male/female tool tolerances will correspond to eventual variations in dimensions of the finished articles and also the tool dimensions can be determined corresponding with the dimensions of the finished article. In FIG. 12b is also shown that the measure S (thickness of finished laminate) optionally can be controlled to a certain measure by said addition of nano-sized fiber-like reinforcement elements 17.

FIG. 13a illustrates a production step wherein static electric voltage of sufficient size (or AC) is applied through the lay-up 45 (seen from above) during a specific time interval of the cure cycle. By adding the CNTs 17' and thereby providing the high carbon fiber volume, such voltage or current is possible to transfer transversally through the lay-up 45. The voltage or current will make the fibers in the plies 13 with lower viscosity during said interval in a pre-determined area of the lay-up 45 to repel each other. This lower viscosity (than the viscosity of the resin surrounding said area) makes it possible to enforce separations between the micro-sized reinforcement fibers 15 creating a window W. In such way is provided that controlling of the spacing of the micro-sized reinforcement carbon fibers 15 is achieved. The voltage is preferably applied in a specific period of the cure process for each CFRP material. This means at the same time that the nano-sized fiber-like reinforcement elements penetrate deeper into the pre-preg plies within the window W, and thus will be positioned partly inside the micro-sized reinforcement element distributions 23. The nano-sized fiber-like reinforcement elements will not be hindered by an upper-most layer of micro-sized reinforcement carbon fibers embedded in the resin ply within the created window W. FIG. 13b illustrates one aspect wherein the window W is created through which a bolt hole (not shown) will be drilled. By means of the created window W, the bolt bearing strength can be optimized. This will also improve the strength within the pre-preg plies 13 and also improve the bolt bearing-, open hole compression-, interlaminar shear-intralaminar tension—and pure tension strength.

FIG. 14a illustrates one aspect to produce the composite material 7. A pre-preg ply 13 is applied onto a forming male tool (not shown). The pre-preg ply 13 comprises resin and aramid fibers 15' embedded therein. In a next step a resin mat 21 comprising graphene-based nano-sized platelets is applied onto the pre-preg ply 13. The amount of graphene-based nano-sized platelets and the amount of resin is determined to provide that the resin of the pre-preg ply 13 will be drawn into the mat 21 comprising the graphene-based nano-sized platelets, thus further filling the resin content in the mat but at the same time providing a high aramid fiber 15' volume of the ply 13. FIG. 14b illustrates one aspect to produce the composite material 7. A pre-preg ply 13 is applied onto a forming male tool. The pre-preg ply 13 comprises resin and silicon carbide fibers 15" embedded therein. In a next step a mat 21 comprising silicon nano materials being applied onto the ply 13. FIG. 14c illustrates one aspect to produce the composite material. A heating apparatus 51 is moved over the applied dry mat 21 in FIG. 14b for heating the mat 21 and the ply 13. The heating apparatus 51 is thus introduced for rapidly heating the actual pre-preg ply 13 in order to impregnate the dry mat 21 immediately after positioning it on the pre-preg ply 13 surface. The heating apparatus 51 is for example an infrared (IR) heating, but other apparatuses can be used as well known in the art.

FIGS. 15a-15b illustrate flow charts according two aspects of the invention. FIG. 15a illustrates the flow chart of the method for producing the composite material according to one aspect. The alternative method for manufacture of the composite material 7 having desired electrical and/or thermal and/or strength and/or elongation and/or strength build-up properties, said composite material 7 comprising matrix material 19 and micro-sized reinforcement element distributions 23, each distribution 23 being arranged in a respective ply 13.

The method starts in a Step 101. In Step 102 is provided the method for producing the composite material. In Step 103 the method is fulfilled.

The step 102 comprises the steps of: Providing nano-sized reinforcement elements 17, 17', 17", 17''' having matrix material accumulation properties; determining thickness, package degree, orientation, and/or number of layers of said nano-sized reinforcement elements 17, 17', 17", 17'''; and arranging the nano-sized reinforcement elements 17, 17', 17", 17''' in between the micro-sized reinforcement element distributions 23 thereby providing tailored increased reinforcement volume of said distributions 23, wherein said thickness, package degree, orientation and number of layers of said nano-sized reinforcement elements 17, 17', 17", 17''' being determined so as to provide the desired electrical and/or thermal and/or strength and/or elongation and/or strength build-up properties of the composite material 7.

FIG. 15b illustrates a flow chart of the method for producing the composite material according to another aspect. Step 201 corresponds to a starting (start-up) of a production line. Step 202 defines the providing of a tool surface. Step 203 defines the application of a first pre-preg ply (comprising carbon fibers) of a lay-up onto the tool surface. Step 204 defines the application of a first CNT-mat impregnated with additional resin, and the application is made onto the first pre-preg-ply. Step 205 defines the step of arranging the nano-sized reinforcement elements 17, 17', 17", 17''' in radial direction of a planned hole 33, 34, 36 of the composite material 7. Step 206 defines the application of a second pre-preg ply (comprising carbon fibers) onto the first CNT-mat and repeating the step 205 wherein step 207 defines the application of a second CNT-mat onto the second pre-preg ply. Step 208 defines all repeating steps similar to previous steps 202-207 until the lay-up is finished. Step 209 defines forming and curing of the lay-up and step 210 defined the drilling of the holes 33, 34, 36 of the composite for finishing the article. Step 211 defines that the method is fulfilled in the production line. Alternatively, the nano-sized fiber-like reinforcement elements length and density can be varied through the composite material.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. The article can be an aeronautic article or other article for e.g. wind power stations, trains, etc.

The method may comprise the step of applying a voltage to the matrix material for repelling the micro-sized reinforcement elements 23 from each other in pre-determined areas of the material thereby altering the distribution of the nano-sized reinforcement elements 17, 17', 17", 17''' between the micro-sized reinforcement elements 23. The matrix material may comprise nano-sized reinforcement elements 17, 17', 17", 17''' as well.

Figure 16A:
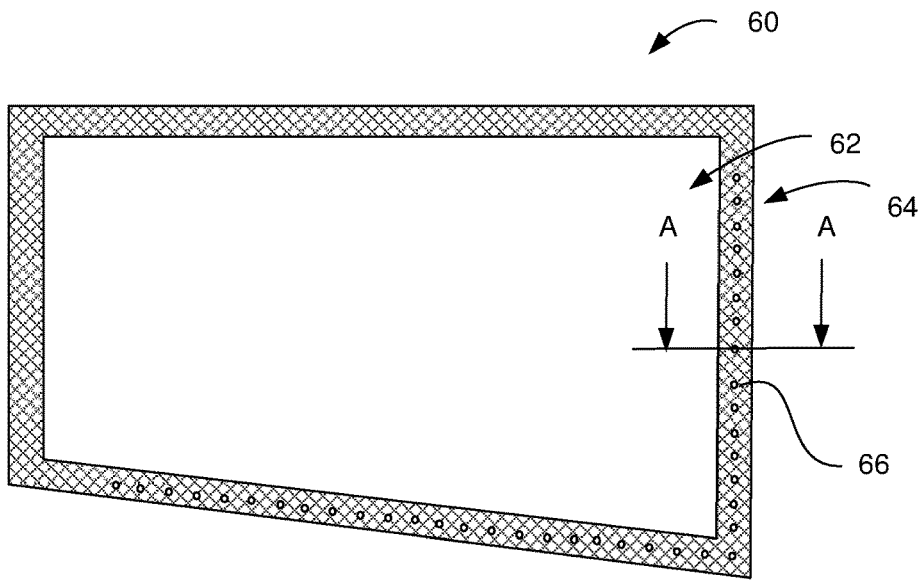
FIGS. 16a-16c illustrate some further aspects of the invention.
Figure 16B:
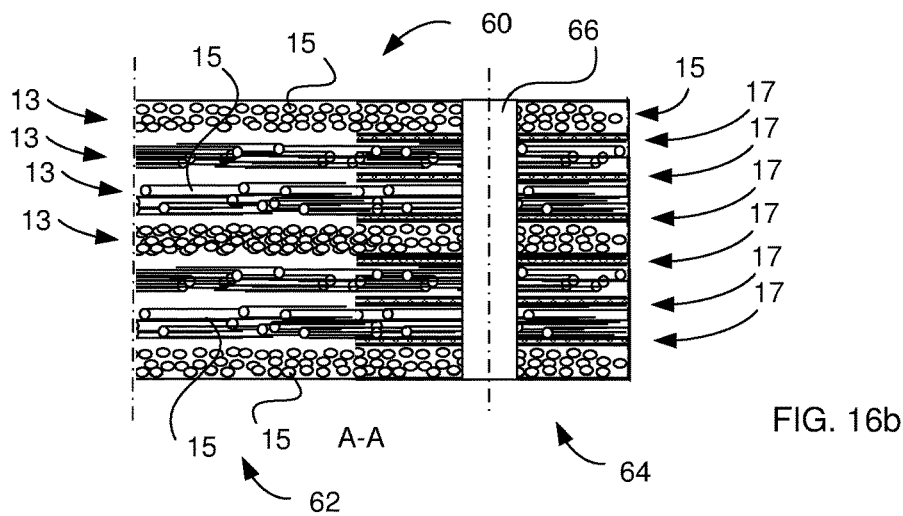

FIG. 16a schematically illustrates a skin panel 60 made of the composite material 7 for an aircraft wing. An outer perimeter section 64 of the skin panel 60 comprises bore holes 66. Bolts (not shown) bond the skin panel 60 to a sub-structure (not shown). A section 62 of the skin panel 60 is free from bore holes. The cross section A-A taken in FIG. 16a is schematically shown in FIG. 16b. The number of pre-preg plies 13 is illustrated schematically. The number of pre-preg plies can be e.g. one hundred or more or less in a skin panel across the thickness of the skin panel. However, as is shown in cross-section A-A, the outer perimeter section comprising the bore holes 66 is arranged with nano-sized fiber-like reinforcement elements 17. The nano-sized fiber-like reinforcement elements 17 are applied between and in interfaces between the pre-preg plies 13, which comprise micro-sized reinforcement elements (e.g. carbon fibers) 15. In this example, knocked down nano-sized fiber-like reinforcement elements 17 are positioned adjacent the bore hole wall for additionally strengthening the bore hole area.

Figure 16C:
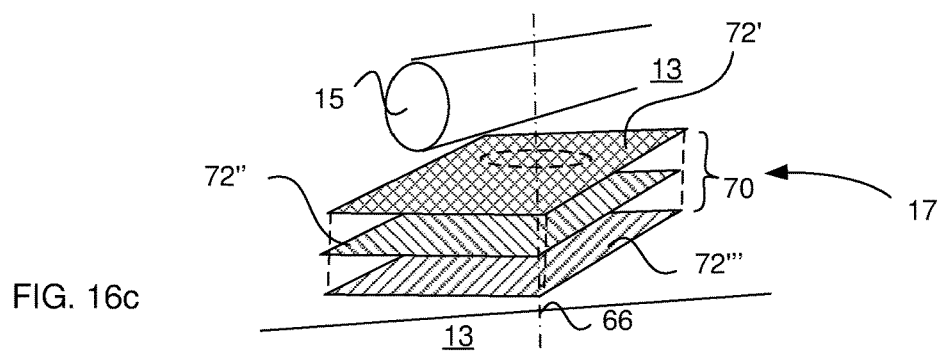

In FIG. 16c is shown one example of providing strength in the outer perimeter section 64 (or in other applications or structural sections of composite that have to exhibit extreme high strength, still with a low weight) by the addition of nano-sized fiber-like reinforcement elements 17 between the pre-preg plies 13. The with nano-sized fiber-like reinforcement elements 17 between the pre-preg plies 13 are in turn laid as a cross-ply nano mat 70. Each cross-ply nano substrate 72', 72", 72''' of the cross-ply nano mat 70 comprises nano-sized fiber-like reinforcement elements 17 having unidirectional (or e.g. random) orientation, which unidirectional orientation of one cross-ply nano substrate 72' differs from the orientation of adjacent cross-ply nano substrates 72" and 72''' with crossing unidirectional orientation. In such way is a quasi-isotropic functionality is provided between the pre-preg plies 13 within the bore hole 66 outer perimeter section 64.

Mechanical properties, such as strength and stiffness, are thus added to the bore hole 66 outer perimeter section 64.

The matrix material of the composite may comprise cured resin, ceramics, graphite and/or metal and/or elastomer and/or rubber. The micro-sized reinforcement elements can be of any type of reinforcement fiber-like elements, such as carbon fibers, metal fibers etc.

The matrix material accumulation properties so as to provide an tailored increased reinforcement volume of said distributions can be achieved by adding the nano-sized fiber-like reinforcement elements either between the distributions or inside the distributions, separately inside or between, excessive inside and/or insignificant between or combinations thereof.

It is thus possible to improve other composite materials such as composites based on ceramic matrix composites. The method involves the use of added carbon nano tubes in different engineered arrangements, e.g. by using various kinds of CFRP materials and nano materials in combination with or without extra layer/s of resin. One example of a base material that can be improved by adding nano materials, is pre-impregnated CFRP comprising reinforcement fibers. Reinforcement fibers such as aramid, aluminium oxide, ceramic. quartz, silicon carbide or glass fibers can be used in composites suitable for improvements. Also reinforcement fibers embedded in plies may comprise combinations of carbon and glass fibers or combinations of carbon, aramid and glass fibers. The polymeric resin may comprise a base resin such as epoxy, cyanatester, vinyl ester or other plastics. Additionally, the resin may comprise a curing agent. Depending on the nano additive size, direction, height and other characteristics, there are different ways to improve mechanical, electrical, processing and other properties. The addition of nano materials can allow for different improved types of CFRP materials and also significantly improve the manufacturing capability of the material. By adding a thermoplastic component to the composite material used to build a structure, the fracture toughness of inherently brittle CFRP materials based on thermo-set resin can be improved. The cases, non-fiber reinforced materials are also possible to improve in similar ways as those described here for fiber composites. The application of CNT forests will improve mechanical, electrical and thermal properties of the composite material, fully of locally where it is used. Preferably, the nano-sized fiber-like reinforcement elements (CNT, nano fibre, nano multi wall filament, nano double wall filament, nano wire etc.) exhibits a length of 0.125 mm or less for certain applications. This is suitable for a common pre-preg ply having a thickness of 0.125 mm used in the production of aircrafts. Preferably, the diameter of a multiwall nano carbon tube is 15-35 nm, suitably 18-22 nm. Suitably, the diameter of a single wall carbon nano tube is 1.2-1.7 nm, preferably 1.35-1.45 nm. The lay-up can be applied in different ways, having different fiber orientations for each ply, and may comprise the fiber nano element mat which is infused with resin. The lay-up may comprise pre-preg tapes such as unidirectional pre-impregnated fiber plies, fibers being of woven carbon fiber pre-preg fabrics or glass, Kevlar, spectra pre-preg tapes and fabrics etc. Thereby a laminate stack can be built by means of an ATL-apparatus, which is cost-effective. Skins and substructures for aircraft may be provided by laminating multiple plies having reinforcement fibers of respective ply oriented in different directions. Each ply may thus comprise micro-sized reinforcement elements, such as carbon fibers, graphite fibers and/or carbon nano tubes oriented in different directions. For example, a ply comprising span wise oriented carbon fibers could be laid onto and adjacent a ply comprising chord wise oriented carbon fibers and upon this one a further ply having 45 degrees oriented fibers relative the span wise direction of an aircraft wing.

The invention claimed is:

1. An article (5) comprising at least one composite material, comprising matrix material (19) and at least one micro-sized reinforcement element distributions (23), arranged in plies (13) positioned on top of each other, wherein nano-sized reinforcement elements (17, 17', 17", 17''') are arranged at least one of in between, inside of, or on one side of an outer surface of the micro-sized reinforcement element distributions (23), wherein the nano-sized reinforcement elements (17, 17', 17", 17''') have matrix material accumulation properties so as to provide a tailored increased reinforcement volume of said one or more distributions (23), wherein a portion of the nano-sized reinforcement elements (17, 17', 17", 17''') are each arranged with orientation parallel with the plane of the ply (13) and in a radial direction relative to a hole (33, 34, 36) in the composite article (5), and wherein a majority of the portion of the nano-sized reinforcement elements (17, 17', 17", 17''') are positioned adjacent to and surrounding the hole (33, 34, 36).

2. The article according to claim 1, wherein the micro-sized reinforcement element distribution comprises micro-sized fiber distributions (23).

3. The article according to claim 2, wherein fibers of the micro-sized fiber distributions (23) are structural reinforcement fibers of graphite, carbon, silicon carbide, alumina, E-glass, aramid, polyethylene, quartz, organic or other fibers or a combination of these used for this purpose as well as fibers used for electrical or thermal properties or other purpose.

4. The article according to claim 1, wherein the matrix material is either one or several different materials.

5. The article according to claim 4, wherein the matrix materials are one or more of: several thermoset polymeric materials selected from the group consisting of: epoxy based resin, bismaleimide resin, polyimide, vinyl ester, cyanate ester, phenyl ethynyl-terminated imide (PETI) resin, thermoplastic polymeric materials and phenolic resin, or combinations thereof; or a thermoplastic resin selected from the group consisting of: polyether ether ketone (PEEK), polyether ketone ketone (PEKK), polyphenylene sulfide (PPS), polyetherimide (PEI), nylon 6, nylon 66, polyethylene terephthalate (PET), or combinations thereof; or mixtures thereof; or ceramic materials; or metallic materials.

6. The article to claim 1, wherein the micro-sized reinforcement element distributions (23) comprise an arrangement of the nano-sized reinforcement elements.

7. The article according to claim 6, wherein the nano-sized reinforcement elements (17, 17', 17", 17''') comprise Carbon Nano Tubes (CNTs).

8. The article according to claim 7, wherein the nano-sized reinforcement elements are aligned as at least one of grown CNT "forests", radially grown CNTs on micro-sized fibers, or one or more other available forms of nano-sized materials in aligned arrangements.

9. The article according to claim 1, wherein the nano-sized reinforcement elements (17, 17', 17", 17''') are arranged in between at least two plies (13) of the composite article (5), including the case where the nano-sized reinforcement elements have been formed or grown on the surface of the micro-sized reinforcement elements.

10. The article according to claim 1, wherein at least one of the location, width, height, or volume content of the nano-sized reinforcement elements (17, 17', 17", 17''') is at least one of constant or different, including locally no addition of nano-sized materials, through the thickness of the composite article (5).

11. The article according to claim 1, wherein another portion of the nano-sized reinforcement elements (17, 17', 17", 17''') are aligned in a direction at least one of orthogonally or any angle direction to the plane of the ply (13).

12. The article according to claim 1, wherein the nano-sized reinforcement elements (17, 17', 17", 17''') are arranged in single or multiple individual sub-plies stacked or interleafed as to form combinations of element orientations and sub-ply thicknesses suitable regarding functionality to enhance overall composite manufacturability and performance.

13. The article according to claim 1, wherein the nano-sized reinforcement elements (17, 17', 17", 17''') comprise Nano Cones.

14. The article according to claim 1, wherein the nano-sized reinforcement elements (17, 17', 17", 17''') comprise Nano Discs.

15. The article according to claim 1, wherein the nano-sized reinforcement elements (17, 17', 17", 17''') comprise Nano Fibers.

16. The article according to claim 1, wherein the micro-sized reinforcement element distributions (23) comprise graphene.

17. The article according to claim 1, wherein the micro-sized reinforcement element distributions (23) comprise distributed grown nano-sized reinforcement elements grown on a graphene substrate.

18. The article according to claim 1, wherein the micro-sized reinforcement element distributions (23) comprise graphite, including multilayers of graphene.

19. The article according to claim 1, wherein the micro-sized reinforcement element distributions (23) comprise distributed grown nano-sized reinforcement elements grown on a graphite substrate.

20. The article according to claim 1, wherein the composite material is arranged for improved strength or reduced strength.

21. The article according to claim 1, wherein the composite material is arranged for de-icing/anti-icing.

22. The article according to claim 1, wherein the composite material is arranged for electrical conductivity/insulation of the article, including fulfilling the criteria for a functionally graded material.

23. The article according to claim 1, wherein the composite material is arranged for electromagnetic transmission, including fulfilling the criteria for a functionally graded material.

24. The article according to claim 1, wherein the composite material is arranged for thermal conductivity/insulation of the article, including fulfilling the criteria for a functionally graded material.

25. The article according to claim 1, wherein the composite material is arranged for controlled thermal elongation and/or contraction of the article, including fulfilling the criteria for a functionally graded material.

26. The article according to claim 1, wherein the composite material is partly or totally made up from pre-impregnated micro-sized reinforcement elements, such as pre-preg plies.

27. The article according to claim 1, wherein the composite material is partly or totally made up from any other composite material form suitable to a selected manufacturing method.

28. The article according to claim 1, wherein another portion of the nano-sized reinforcement elements (17, 17', 17", 17''') are protruding fiber-like elements extending away from and above an outer surface of the article.

* * * * *